United States Patent
Yamagishi et al.

(12)

(10) Patent No.: US 6,373,629 B1
(45) Date of Patent: Apr. 16, 2002

(54) POLARIZED LIGHT ILLUMINATOR AND PROJECTING TYPE IMAGE DISPLAY

(75) Inventors: Shigekazu Yamagishi, Takatsuki; Yoshihiro Masumoto, Kobe, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/341,021

(22) PCT Filed: Nov. 24, 1998

(86) PCT No.: PCT/JP98/05279

§ 371 Date: Jun. 30, 1999

§ 102(e) Date: Jun. 30, 1999

(87) PCT Pub. No.: WO99/28780

PCT Pub. Date: Jun. 10, 1999

(30) Foreign Application Priority Data

Dec. 1, 1997 (JP) .............................................. 9-329961

(51) Int. Cl.⁷ .......................... G02B 5/30; G02B 21/14; G02F 1/1335

(52) U.S. Cl. ......................... 359/487; 359/485; 362/19; 353/20; 349/5; 349/9

(58) Field of Search ................................ 359/483, 485, 359/487; 349/5, 9; 353/20; 362/19, 268, 308, 309, 330, 331

(56) References Cited

U.S. PATENT DOCUMENTS

| | | | | |
|---|---|---|---|---|
| 5,052,783 A | * | 10/1991 | Hamada | 349/5 |
| 5,098,184 A | * | 3/1992 | Van Den Brandt et al. | 362/309 |
| 5,418,583 A | * | 5/1995 | Masumoto | 362/268 |
| 5,623,348 A | * | 4/1997 | Ogino | 349/5 |
| 5,764,412 A | * | 6/1998 | Suzuki et al. | 359/487 |
| 5,865,521 A | * | 2/1999 | Hashizume et al. | 353/20 |
| 5,973,840 A | * | 10/1999 | Itoh et al. | 359/618 |

FOREIGN PATENT DOCUMENTS

| | | |
|---|---|---|
| EP | 0 753 780 | 1/1997 |
| EP | 0 829 739 | 3/1998 |
| JP | 4-212104 | 8/1992 |
| JP | 8-114765 | 5/1996 |
| JP | 10-170869 | 6/1998 |
| JP | 10-319349 | 12/1998 |

\* cited by examiner

Primary Examiner—Cassandra Spyrou
Assistant Examiner—John Juba, Jr.
(74) Attorney, Agent, or Firm—Merchant & Gould PC

(57) ABSTRACT

Randomly polarized light from a light source (106) enters a polarization separation section (103) through an integrator optical system (102) including a second lens plate (110) designed to have variant apertures. The polarization separation section (103) separates the incident light into two polarized lights whose polarization directions are orthogonal to each other. Then, the polarization directions of these polarized lights are aligned by a polarization conversion section (104). Thus, a polarized-light illumination unit in which polarization directions of randomly polarized light is converted into a desired polarization direction and at the same time the spread of illumination light can be suppressed can be obtained. Such a polarized-light illumination unit can be used suitably as an illumination unit for a projection-type image display unit using a liquid crystal light valve for modulating light by utilizing polarization and enables both the reduction in cost and the increase in luminance in the projection-type image display unit.

24 Claims, 23 Drawing Sheets

POLARIZED LIGHT ILLUMINATOR AND PROJECTING TYPE IMAGE DISPLAY

TECHNICAL FIELD

The present invention relates to a polarized-light illumination unit that illuminates a rectangular area uniformly using-polarized light whose polarization directions have been aligned. The present invention also relates to a projection-type image display unit that magnifies and projects images onto a screen by modulating polarized light emitted from the polarized-light illumination unit using a light valve.

BACKGROUND ART

Projection-type image display units using a liquid crystal panel as a light valve are excellent particularly in their small size, light weight, and ease of installation, and therefore have been forming a market rapidly as presentation tools. The projection-type image display units also are expected to become widespread in a consumer field, since they are excellent in their small size, light weight, and uniformity in image quality from the center to the periphery compared to a conventional CRT projection TV.

In the market of these projection-type image display units (hereafter referred to as "liquid crystal projectors") using a liquid crystal panel as a light valve, there are two needs, namely the increase in luminance and the reduction in cost.

With respect to the increase in luminance, it also is conceivable to handle it by replacing a light source with one that consumes a larger amount of electricity. However, this is a temporary countermeasure. Obviously, it is most desirable to handle it by further improving the utilization efficiency of light from the light source. A conventional liquid crystal light valve can utilize only one of two polarization directions, thus wasting half of the incident light as heat. However, based on the above-mentioned backgrounds, illumination units employing a system according to Publication of Japanese Unexamined Patent Application Tokkai Hei 8-304739 or a system to which said system is applied have been developed recently, thus improving the light utilization efficiency greatly. This configuration will be described with reference to FIG. 23 as follows.

A light source section 910 comprises a light-source lamp 911 and a reflector 912. Randomly polarized light emitted from the lamp 911 is reflected in one direction by the reflector 912 and enters a first lens plate 920 in an integrator optical system. The first lens plate 920 is a compound lens member in which many rectangular minute lenses 921 are arranged. The light that has entered there is gathered by respective minute lenses 921. Illuminant images are formed on a second lens plate 930 by the minute lenses 921. The second lens plate 930 comprises a condenser-lens array 931 that is placed in the vicinity of the position where the illuminant images are formed, a polarization-separation prism array 933 formed of an aggregate of polarization beam splitters 934, a λ/2 phase-difference plate 935, and a lens 937 at the outgoing side. The illuminant images are formed on the array 931 by respective minute lenses 921 in the first lens plate 920. Then, a ray of light is separated by the polarization beam splitters 934 depending on its polarization direction. The polarization directions of the rays of light that have been separated are aligned by the λ/2 phase-difference plate 935. After that, the rays of light pass through the lens 937 and illuminate an illumination area 940. Thus, the polarization directions of the randomly polarized light from the light-source lamp 911 can be aligned efficiently.

On the other hand, with respect to the reduction in cost, in order to reduce the cost of the liquid crystal panel, which has the highest proportion of cost in the entire costs, the effort for decreasing a panel size has been made. Concretely, the cost reduction is targeted by increasing the number of panels obtained at one time through changing panels with a diagonal length of 1.3 inches, which were the conventional majority, into those with a diagonal length of 0.9 inch and further into those with a diagonal length of 0.5 inch.

However, when seeking to maintain the same resolution as that in a conventional unit while decreasing panel size, damping of light increases in an effective image display area on a panel. Particularly, when a transmission light valve is used, apertures of pixels are decreased in size considerably, thus decreasing light transmittance.

As described above, the high luminance and the low costs have been very difficult to attain at the same time. Methods for tackling this include a method of improving an apparent numerical aperture by providing microlenses for respective pixels on a panel with a decreased size. In this method, however, the microlenses narrow down incident light once, but then a ray of light spreads. Therefore, an illumination unit that can provide light with a small spread angle, in other words, with a large illumination f-number, as incident light is required.

On the other hand, when actually manufacturing products using the method in the Publication of Japanese Unexamined Patent Application Tokkai Hei 8-304739, it is advantageous in practice to form the polarization beam splitters 934 using prisms with a parallelogramatic cross-sectional shape. Therefore, the prisms with this shape are mounted in current products. Further, in order to process the prisms at low cost, it is desirable that all the aforementioned polarization beam splitters 934 have the same thickness in the direction of the system optical axis 952 (a distance between two opposed planes orthogonal to the system optical axis). As a result, all the prisms forming the polarization beam splitters have the same shape. Consequently, when the shape of the prisms is designed to correspond to the biggest illuminant image in the vicinity of the central portion (in the vicinity of the system optical axis) in the illuminant images formed on the condenser lens array 931, the prisms have a useless portion for relatively small illuminant images formed at the periphery. Therefore, the second lens plate 930 itself is increased in size, and thus illumination light comes to have a small illumination f-number and a wide incidence angle, which has been a problem.

Thus, in the conventional technique, high luminance and the low costs have been difficult to attain at the same time.

DISCLOSURE OF THE INVENTION

The present invention seeks to solve the above-mentioned conventional problems. It is an object of the present invention to provide a polarized-light illumination unit in which illumination light spreads a little (the illumination f-number is large) and the polarization directions of randomly polarized light from a light source can be converted to a desired polarization direction.

It is another object of the present invention to provide a low-cost pojection-type image display unit that has high light utilization efficiency thus enables images with high luminance to be obtained.

In order to attain the above-mentioned objects, the present invention employs the following configurations.

A polarized-light illumination unit according to a first configuration of the present invention comprises: a light source for emitting randomly polarized light; an integrator optical system having a first lens plate formed of an aggregate of a plurality of rectangular lenses, a second lens plate formed of an aggregate of a plurality of minute lenses corresponding to the rectangular lenses one to one, and a condenser lens; a polarization separation section for separating the light emitted from the light source into two polarized lights whose polarization directions are orthogonal to each other and whose optical axes are substantially parallel to each other; and a polarization conversion section for aligning the polarization directions of the two polarized lights. The respective rectangular lenses are formed to have shifted centers of aperture and curvature so that illuminant images are formed in a plurality of rows on the second lens plate by the rectangular lenses in the first lens plate. The minute lenses in the second lens plate are arranged in a form of a plurality of rows at the positions where the illuminant images are formed by the rectangular lenses. The plurality of rows of the minute lenses includes at least one row with a different width H in a direction orthogonal to the longitudinal direction of the rows from that of the other rows. The polarization separation section is formed by assembling a plurality of minute polarization beam splitters. Each minute polarization beam splitter has a reflection-mirror plane provided obliquely to the system optical axis, a polarization separation plane provided in parallel to the reflection-mirror plane, and two planes orthogonal to the system optical axis. The polarization separation plane has a polarization separation film that separates light from the second lens plate by transmitting or reflecting the light depending on its polarization direction. All the minute polarization beam splitters forming the polarization separation section have the same distance d between the two planes orthogonal to the system optical axis. At least one minute polarization beam splitter with a different distance h between the reflection-mirror plane and the polarization separation plane from that of the other splitters is included.

A polarized-light illumination unit according to a second configuration of the present invention comprises: a light source for emitting randomly polarized light; an integrator optical system having a first lens plate formed of an aggregate of a plurality of rectangular lenses, a second lens plate formed of an aggregate of a plurality of minute lenses corresponding to the rectangular lenses one to one, and a condenser lens; a polarization separation section for separating the light emitted from the light source into two polarized lights whose polarization directions are orthogonal to each other and whose optical axes are substantially parallel to each other; and a polarization conversion section for aligning the polarization directions of the two polarized lights. The respective rectangular lenses are formed to have shifted centers of aperture and curvature so that illuminant images are formed in a plurality of rows on the second lens plate by the rectangular lenses in the first lens plate. The minute lenses in the second lens plate are arranged in a form of a plurality of rows at the positions where the illuminant images are formed by the rectangular lenses. The plurality of rows of the minute lenses includes at least one row with a different width H in a direction orthogonal to the longitudinal direction of the rows from that of the other rows. The polarization separation section is formed by assembling a plurality of minute polarization beam splitters. Each minute polarization beam splitter has a polarization separation plane provided obliquely to the system optical axis, a plane provided in parallel to the polarization separation plane, and two planes orthogonal to the system optical axis. The polarization separation plane has a polarization separation film that separates light from the second lens plate by transmitting or reflecting the light depending on its polarization direction. All the minute polarization beam splitters forming the polarization separation section have the same distance d between the two planes orthogonal to the system optical axis. At least-one minute polarization beam splitter with a different distance h between the polarization separation plane and the plane parallel thereto from that of the other splitters is included.

A polarized-light illumination unit according to a third configuration of the present invention comprises: a light source for emitting randomly polarized light; an integrator optical system having a first lens plate formed of an aggregate of a plurality of rectangular lenses, a second lens plate formed of an aggregate of a plurality of minute lenses corresponding to the rectangular lenses one to one, and a condenser lens; a polarization separation section for separating the light emitted from the light source into two polarized lights whose polarization directions are orthogonal to each other and whose optical axes are substantially parallel to each other; and a polarization conversion section for aligning the polarization directions of the two polarized lights. The respective rectangular lenses are formed to have shifted centers of aperture and curvature so that illuminant images are formed in a plurality of rows on the second lens plate by the rectangular lenses in the first lens plate. The minute lenses in the second lens plate are arranged in a form of a plurality of rows at the positions where the illuminant images are formed by the rectangular lenses. The plurality of rows of the minute lenses includes at least one row with a different width H in a direction orthogonal to the longitudinal direction of the rows from that of the other rows. The polarization separation section is formed by assembling a plurality of minute polarization beam splitters having the same shape. Each minute polarization beam splitter has a polarization separation plane provided obliquely to the system optical axis, a plane provided in parallel to the polarization separation plane, and two planes orthogonal to the system optical axis. The polarization separation plane has a polarization separation film that separates light from the second lens plate by transmitting or reflecting the light depending on its polarization direction.

A polarized-light illumination unit according to a fourth configuration of the present invention comprises: a light source for emitting randomly polarized light; an integrator optical system having a first lens plate formed of an aggregate of a plurality of rectangular lenses, a second lens plate formed of an aggregate of a plurality of minute lenses corresponding to the rectangular lenses one to one, and a condenser lens; a polarization separation section for separating the light emitted from the light source into two polarized lights whose polarization directions are orthogonal to each other and whose optical axes are substantially parallel to each other; and a polarization conversion section for aligning the polarization directions of the two polarized lights. The respective rectangular lenses are formed to have shifted centers of aperture and curvature so that illuminant images are formed in a plurality of rows or groups on the second lens plate by the rectangular lenses in the first lens plate. The minute lenses in the second lens plate are arranged in a plurality of rows or groups at the positions where the illuminant images are formed by the rectangular lenses. The plurality of rows or groups of the minute lenses have substantially the same width H in a direction orthogonal to their longitudinal direction. The polarization separation section is formed by assembling a plurality of minute polarization beam splitters having the same shape. Each minute polarization beam splitter has a polarization separation plane provided obliquely to the system optical axis, a plane provided in parallel to the polarization separation plane, and two planes orthogonal to the system optical axis. The polarization separation plane has a polarization separation film that separates light from the second lens plate by transmitting or reflecting the light depending on its polarization direction.

According to the polarized-light illumination units of the aforementioned first to fourth configurations, an illumination unit using an integrator optical system comprises a light source for emitting randomly polarized light, an integrator optical system including a second lens plate designed to have variant apertures, a polarization separation section for separating light into two polarized lights whose polarization directions are orthogonal to each other, and a polarization conversion section for aligning the polarization directions of the two polarized lights. Therefore, while the polarization directions of the randomly polarized light from the light source can be converted to a desired polarization direction, the spread of illumination light can be suppressed (the illumination f-number can be increased).

That is to say, since the polarized-light illumination units of the present invention can align the polarization directions of separated polarized lights in the same direction, when using one of them as an illumination unit that requires polarized light, particularly an illumination unit for a projection-type image display unit using a light valve for modulating light by utilizing polarization, the whole randomly polarized light from the light source can be utilized, thus improving the light utilization rate greatly. Further, polarization-separation devices can be formed corresponding to the sizes of illuminant images formed on the second lens plate by the first lens plate, and therefore the illumination f-number can be increased (the spread angle of incident light can be decreased). As a result, in the projection-type image display unit using one of the polarized-light illumination units of the present invention, picture images with high luminance can be obtained without changing the f-number of its projection optical system. In addition, when microlenses are formed on the incident surface of the light valve, the workload of the projection optical system decreases, thus easing obtaining the effect by the microlenses.

A projection-type image display unit according to the present invention comprises: a polarized-light illumination unit; a modulator having a light valve for displaying picture images corresponding to input signals by modulating polarized light from the polarized-light illumination unit; and a projection optical system that magnifies and projects modulated beams that have been modulated by the modulator. The projection-type image display unit is characterized in that the polarized-light illumination unit is any one of the aforementioned first to fourth polarized-light illumination units.

According to the projection-type image display unit of the above-mentioned configuration, since any one of the first to fourth polarized-light illumination units is used as an illumination unit for the projection-type image display unit using a liquid crystal light valve, polarized light whose planes of polarization are aligned can be supplied to a liquid crystal panel and therefore the light utilization efficiency increases, thus improving the brightness of projection image pictures. Since the polarizing plates absorb less heat, the temperature increase in the polarizing plates is suppressed. Further, a cooling system can be decreased in size and in noise. At the same time, a compact and low-cost unit can be obtained. In addition, since the illumination f-number can be increased, it is not necessary to design the projection lens to be particularly bright. As a result, the light utilization rate can be increased without increasing costs and size of the unit and decreasing contrast.

BEST MODE FOR CARRYING OUT THE INVENTION

Embodiments of the present invention will be explained with reference to the drawings as follows.

FIRST EMBODIMENT

Figure 1:
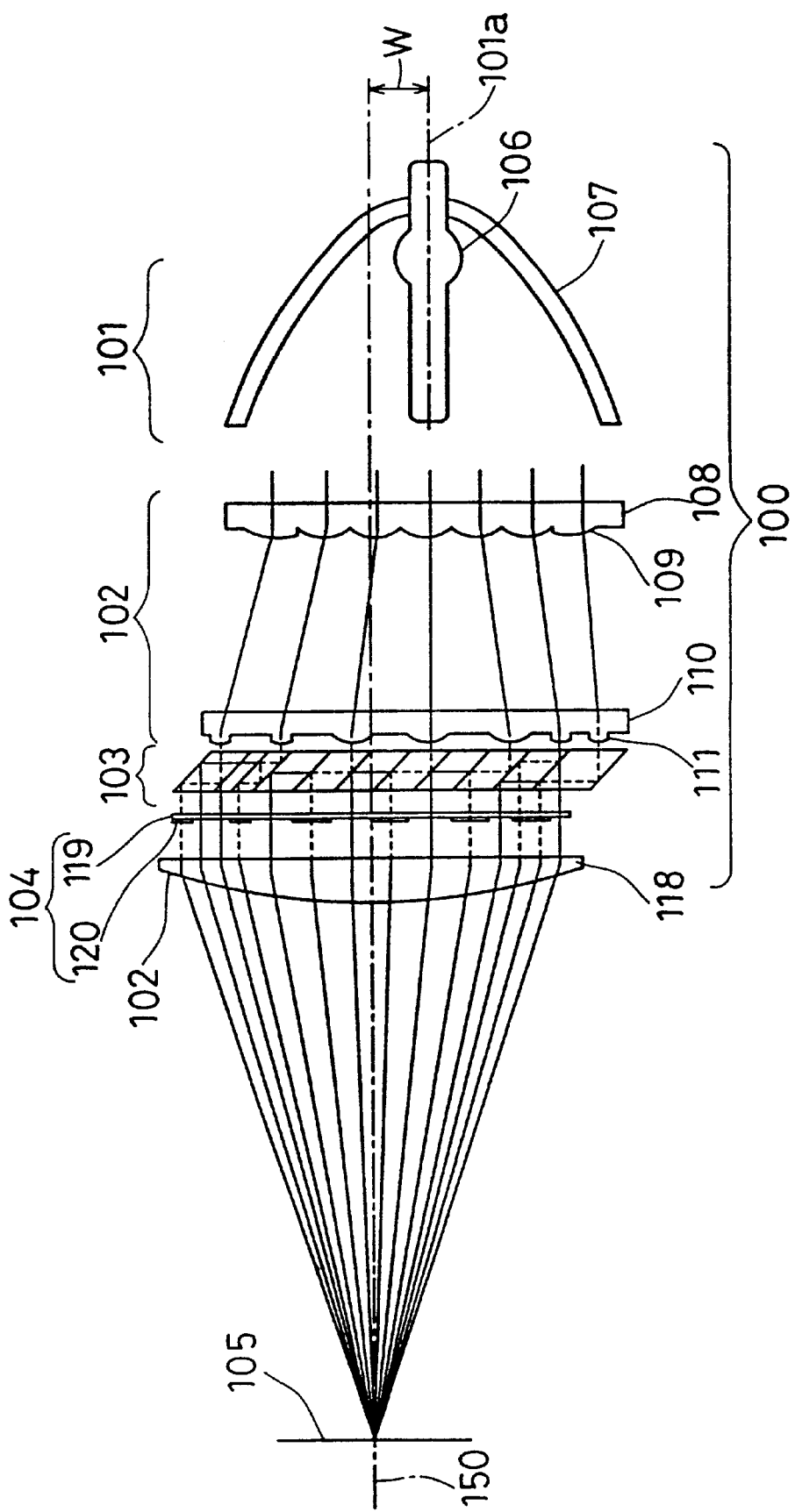
FIG. 1 shows a schematic configuration of a polarized-light illumination unit of a first embodiment of the present invention.

FIG. 1 shows a schematic structural example of a first embodiment of a polarized-light illumination unit according to the present invention. A polarized-light illumination unit 100 of the present embodiment comprises, along a system optical axis 150: a light source section 101; an integrator optical system 102; a polarization separation section 103; and a polarization conversion section 104. Light emitted from the light source section 101 reaches a rectangular illumination area 105 through the integrator optical system 102, the polarization separation section 103, and the polarization conversion section 104. The integrator optical system 102 comprises a first lens plate 108, a second lens plate 110, and a condenser lens 118.

The light source section 101 comprises a light source 106 and a reflector 107. Randomly polarized light emitted from the light source 106 is reflected by the reflector 107 in one direction and then enters the integrator optical system 102. Any of a paraboloid, an ellipsoid, or a spherical surface can be used as a reflection surface of the reflector 107 depending on the design of the optical system.

Figure 2:
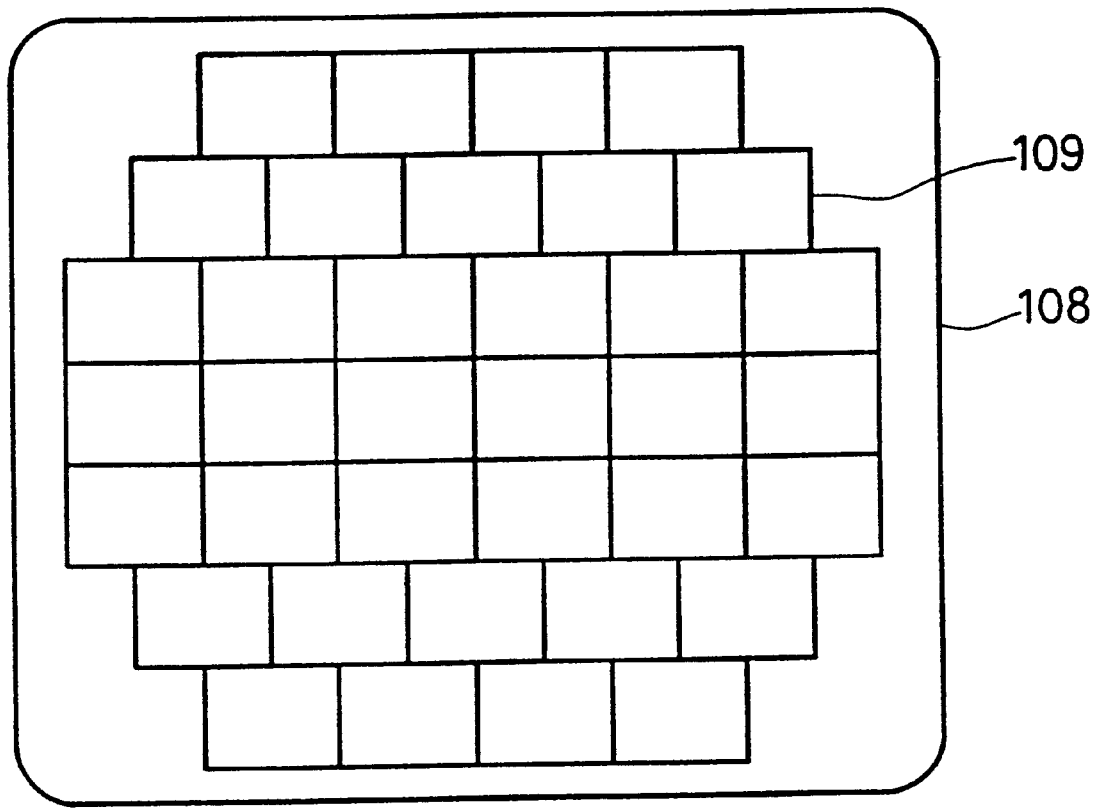
FIG. 2 is a plan view showing the appearance of a first lens plate in the unit shown FIG. 1.

The first lens plate 108 is a compound lens member in which a plurality of minute rectangular lenses 109 are arranged as shown in FIG. 2. Light that has entered the first lens plate 108 is gathered by respective rectangular lenses 109. The rectangular lenses 109 are designed so as to form illuminant images on the second lens plate 110.

Figure 3:
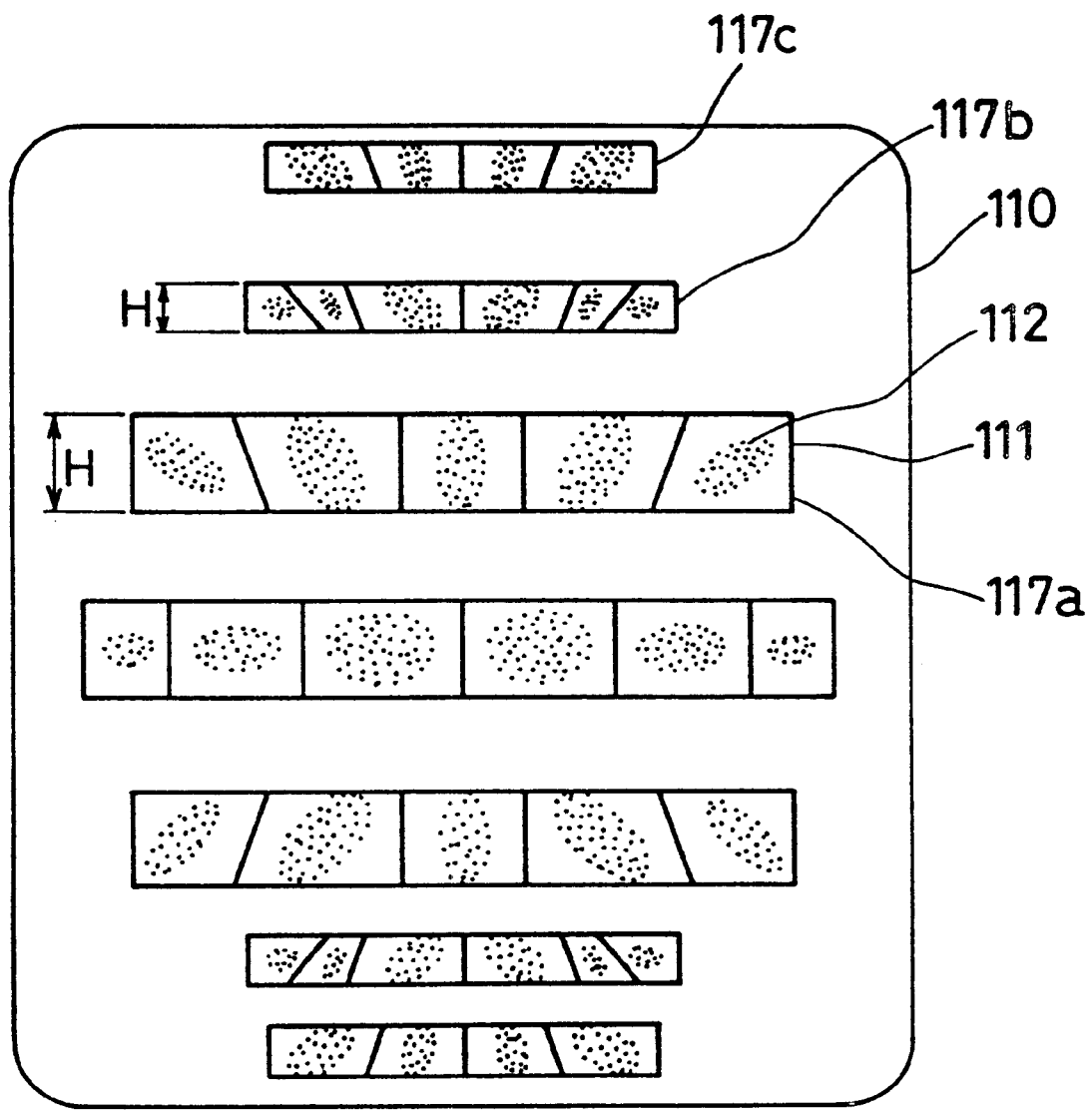
FIG. 3 is a plan view showing the appearance of a second lens plate in the unit shown in FIG. 1.

FIG. 3 shows the appearance of the second lens plate 110. The same number of minute lenses 111 as that of the rectangular lenses 109 formed in the first lens plate 108 are formed and arranged in the second lens plate 110. Respective minute lenses 111 correspond to respective rectangular lenses 109 one to one. The respective rectangular lenses 109 are designed to have shifted centers of aperture and curvature so as to form the illuminant images 112 in a plurality of rows on the second lens plate 110. The minute lenses 111 are arranged at the positions where the illuminant images 112 are formed by the rectangular lenses 109. Further, the areas and shapes of apertures of the minute lenses 111 are set corresponding to the sizes of the illuminant images 112.

The rows of the minute lenses 111 are formed in a plurality of strip shapes in the second lens plate 110 as shown in FIG. 3. Not all the rows have the same width H in a direction orthogonal to the longitudinal direction of each row (an effective aperture width of a minute lens 111 in the vertical direction in FIG. 3). As shown in the figure, rows with a different width H are present.

Figure 4:
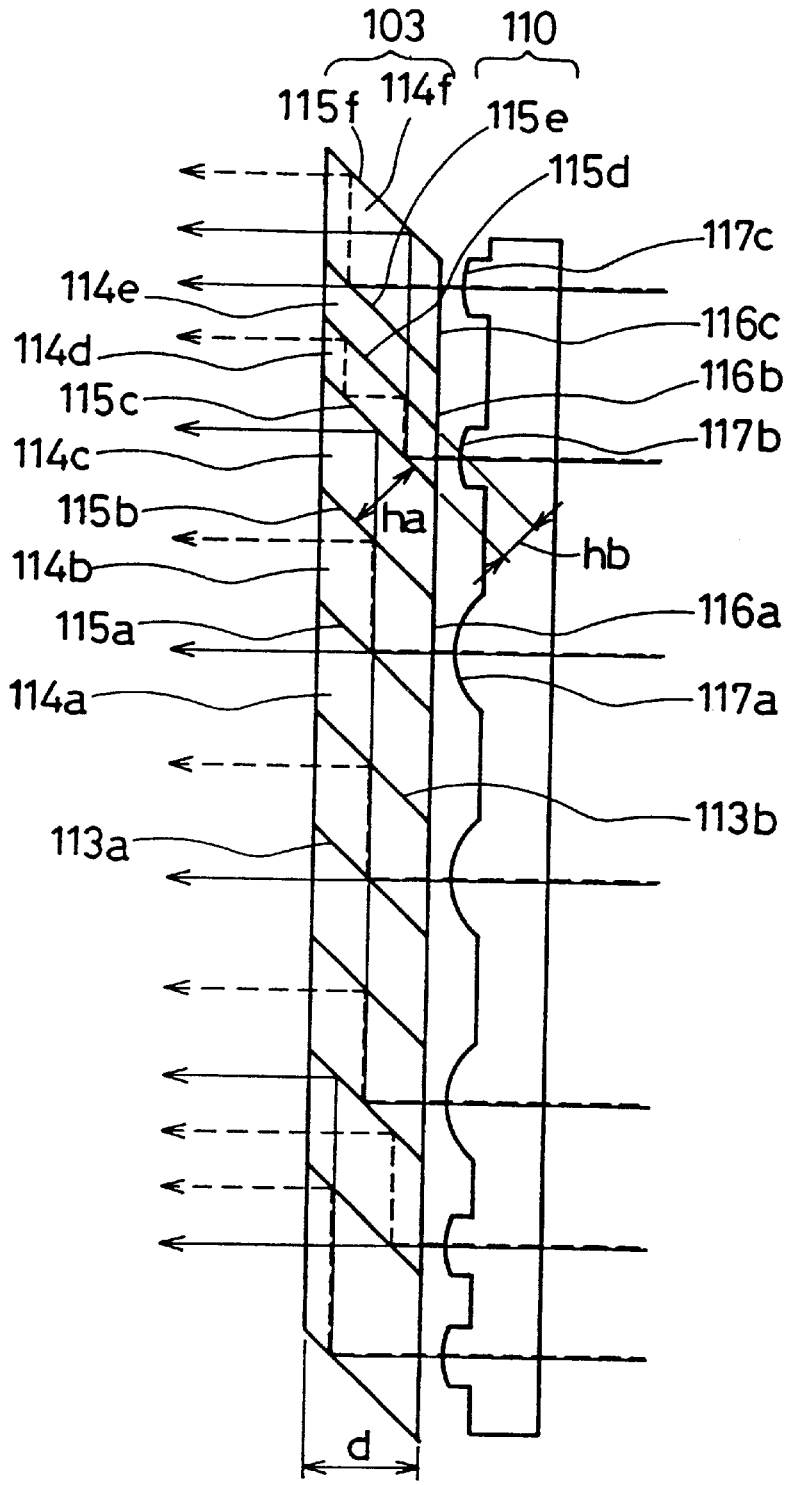
FIG. 4 is a side view showing the arrangement of a polarization separation section and the second lens plate in the unit shown in FIG. 1.

The light gathered by the rectangular lenses 109 in the first lens plate 108 passes through the minute lenses 111 in the second lens plate 110 and then enters the polarization separation section 103. FIG. 4 shows the arrangement of the polarization separation section 103 and the second lens plate 110.

The polarization separation section 103 is an aggregate of minute polarization beam splitters. Each polarization beam splitter (a prism) is formed of a quadratic prism having a parallelogramatic cross-section in a plane perpendicular to a reflection-mirror plane 113a or a polarization separation plane 113b. The planes between prisms 114a and 114b and between prisms 114c and 114d and the plane of the end surface of the prism 114f are treated to serve as reflection mirrors, thus forming reflection-mirror planes. Polarization separation films are provided between the prisms 114b and 114c, between the prism 114d and a prism 114e, and between the prisms 114e and 114f, thus forming polarization separation planes. These prisms are arranged so that rows 117a, 117b, and 117c of the minute lenses 111 in the second lens plate 110 oppose apertures 116a, 116b, and 116c of the prisms. The reflection-mirror plane 113a and the polarization separation plane 113b parallel thereto are arranged obliquely to incident light (i.e. the system optical axis). In addition, the apertures 116a, 116b, and 116c of the prisms are arranged perpendicularly to incident light (i.e. the system optical axis). Not all the prisms have the same distance h between two opposed planes parallel to the reflection-mirror plane 113a or the polarization separation plane 113b of the prisms (a distance h between two opposed sides of the parallelogram parallel to the reflection-mirror plane 113a or polarization separation plane 113b of the prisms in FIG. 4). As shown in the figure, there are prisms with different distances h such as ha and hb between the two opposed planes. On the other hand, all the prisms are formed to have the same distance d between two opposed planes perpendicular to the system optical axis of each prism. Furthermore, the thickness of the prisms is determined so that widths (lengths in the vertical direction in FIG. 4) of the apertures 116a, 116b, and 116c coincide with the widths H of the rows of the minute lenses 111, which oppose the apertures respectively, in the second lens plate 110.

The outgoing light from the row 117a (FIGS. 3 and 4) in the rows of minute lenses in the second lens plate 110 enters the aperture 116a in the polarization separation section 103, is reflected by a reflection mirror 115a, and then is incident on a polarization separation film 115b. At the film 115b, the incident light is separated into transmitted light and reflected light depending on its polarization direction. The reflected light passes through the polarization separation section 103 and then enters a strip-like λ/2 plate 120 (see FIG. 1) that is placed on a base glass 119 and is set to rotate the polarization direction of incident light 90 degrees. The light whose polarization direction has been converted in the λ/2 plate 120 passes through the condenser lens 118 and illuminates the illumination area 105. On the other hand, the transmitted light is reflected again by a reflection mirror 115c positioned parallel to the polarization separation film 115b and then enters the polarization conversion section 104. In this case, a ray of light passes through an area where the λ/2 plate 120 is not formed and therefore is not particularly affected in the area. Then, the ray of light passes through the condenser lens 118 and illuminates the illumination area 105.

The outgoing light from the row 117b, (FIGS. 3 and 4) in the rows of minute lenses in the second lens plate 110 enters the aperture 116b in the polarization separation section 103, is reflected by a reflection mirror 115c, and then is incident on a polarization separation film 115d. At the film 115d, the incident light is separated into transmitted light and reflected light depending on its polarization direction. The reflected light is reflected by the reflection mirror 115c and the polarization separation film 115d again, thus passes through the polarization separation section 103, and then enters the strip-like λ/2 plate 120 that is arranged on the base glass 119 and is set to rotate the polarization direction of incident light 90 degrees. The light whose polarization direction has been converted in the λ/2 plate 120 passes through the condenser lens 118 and illuminates the illumination area 105. On the other hand, the transmitted light passes through a polarization separation film 115e, is reflected by a reflection mirror 115f, and then enters the polarization conversion section 104. In this case, a ray of light passes through an area where the λ/2 plate 120 is not formed and therefore is not particularly affected in the area. Then, the ray of light passes through the condenser lens 118 and illuminates the illumination area 105.

The outgoing light from the row 117c (FIGS. 3 and 4) in the rows of minute lenses in the second lens plate 110 enters the aperture 116c in the polarization separation section 103 and then is incident on the polarization a separation film 115e. At the film 115e, the incident light is separated into transmitted light and reflected light depending on its polarization direction. The reflected light is reflected by the reflection mirror 115f again, thus passes through the polarization separation section 103, and then enters the strip-like λ/2 plate 120 that is arranged on the base glass 119 and is set to rotate the polarization direction of incident light 90 degrees. The light whose polarization direction has been converted in the λ/2 plate 120 passes through the condenser lens 118 and illuminates the illumination area 105. On the other hand, the transmitted light passes through the polarization separation film 115e and then enters the polarization conversion section 104. In this case, a ray of light passes through an area where the λ/2 plate 120 is not formed and therefore is not particularly affected in the area. Then, the ray of light passes through the condenser lens 118 and illuminates the illumination area 105.

By forming a polarized-light illumination unit as described above, polarization directions of randomly polarized light emitted from the light source can be aligned in one direction efficiently, and at the same time the integrator optical system enables uniform illumination, which can be realized substantially without increasing the unit size.

The polarization separation section 103 is an aggregate of prisms that have the same length d in the system optical axis direction. Therefore, laminating a plurality of large prism materials with a predetermined thickness h and slicing it obliquely to the lamination direction enable mass production of the polarization separation sections. Furthermore, all the surfaces can be polished and coated at one time, thus suppressing cost increase to the minimum.

The apertures of the minute lenses 111 in the second lens plate 110 can be formed corresponding to the sizes of illuminant images, thus reducing the size of the second lens plate 110 to the minimum. Therefore, the parallelism of light reaching the illumination area 105 can be improved (the illumination f-number can be increased), thus expanding the application range as an illumination unit for various optical instruments.

In the aforementioned embodiment, the integrator optical system 102, the polarization separation section 103, the polarization conversion section 104, and the condenser lens 118 (a part of the integrator optical system 102) are arranged separately. However, the spaces between respective members are not required, and therefore the members also can be combined into one component.

In the above-mentioned embodiment, the polarization conversion section 104 was explained with reference to the λ/2 plate 212. However, the polarization conversion section 104 is not limited to this, and any means that can convert the polarization direction of incident light may be used. In the aforementioned embodiment, to align the polarization directions, the polarization direction of the outgoing light (s-polarized light in the polarization separation plane) reflected once in the polarization separation section 103 is converted. However, the polarization conversion section 104 may be designed so as to act on the non-reflected outgoing light (p-polarized light in the polarization separation plane) and not to act on the reflected outgoing light from the polarization separation section. Further, the polarization conversion section 104 also may be designed so as to act differently on the reflected outgoing light and the non-reflected outgoing light from the polarization separation section, thus aligning the polarization directions of both outgoing lights.

The condenser lens 118 is not always limited to a spherical lens and can be formed of a Fresnel lens or an aggregate of prisms.

Figure 5:
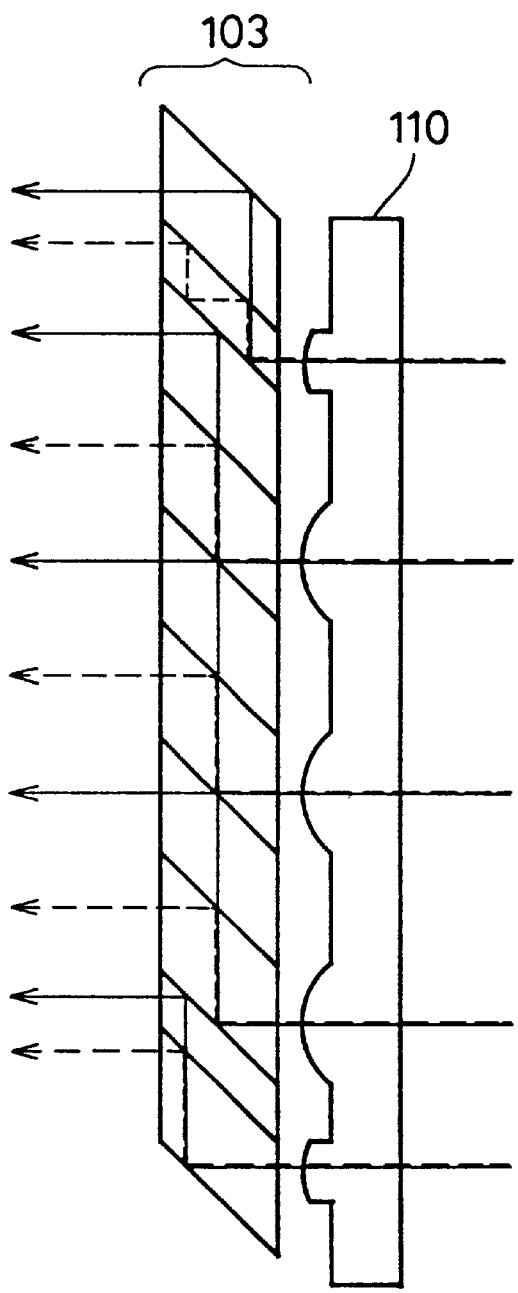
FIG. 5 is a side view showing another arrangement of the polarization separation section and the second lens plate in the unit shown in FIG. 1.
Figure 6:
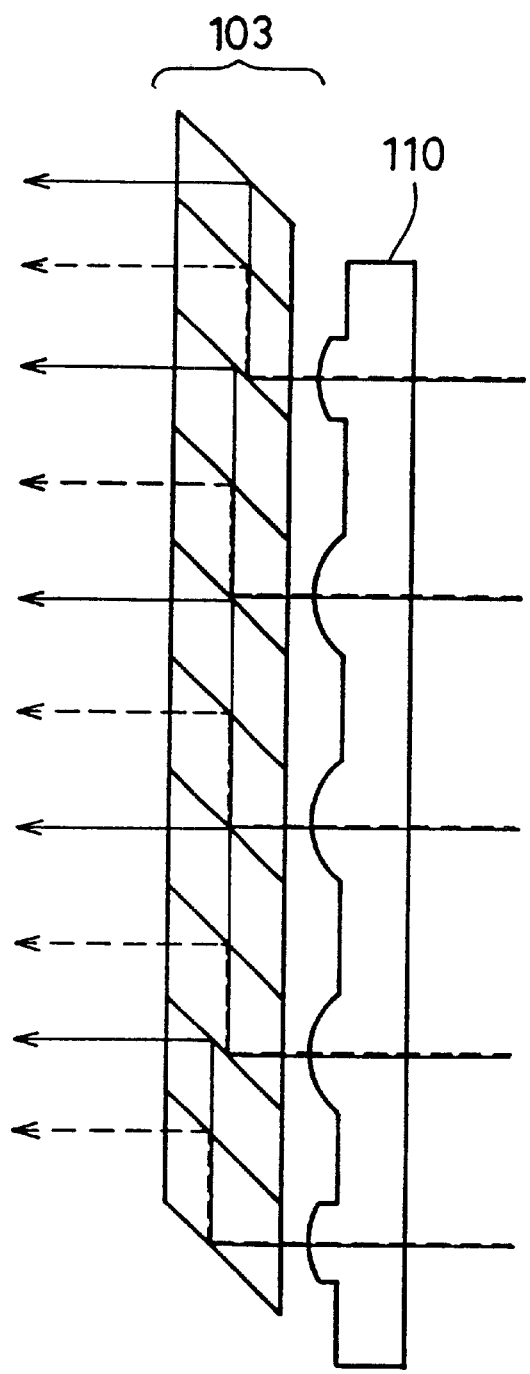
FIG. 6 is a side view showing a further arrangement of the polarization separation section and the second lens plate in the unit shown in FIG. 1.
Figure 7:
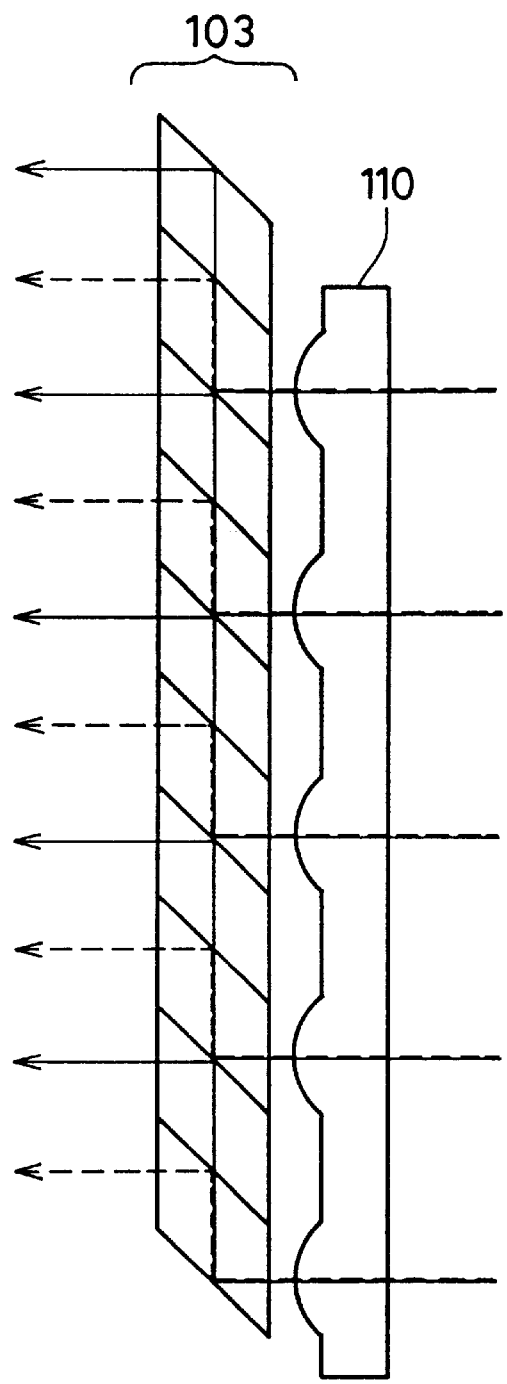
FIG. 7 is a side view showing still another arrangement of the polarization separation section and the second lens plate in the unit shown in FIG. 1.

In the aforementioned embodiment, the ratio of the widths H of the rows 117b, and 117c of minute lenses for the width H of the row 117a of minute lenses that form the rows in the second lens plate 110 is set to be about 117a:117b:117c= 2:1:1. However, the present invention is not limited to this. For example, the ratio of the widths H of minute-lens groups may be set to be about 117a:117b=2:1 by reducing the number of the rows of minute lenses as shown in FIG. 5, or the ratio of the widths H of minute-lens groups may be set to be about 117a:117b=3:2 as shown in FIG. 6. Thus, the widths H can be optimized according to the system. Needless to say, as shown in FIG. 7, the ratio of the widths H of minute-lens groups also can be set to be about 117a:117b= 1:1.

It is preferable that the distance d (see FIG. 4) between two planes orthogonal to the system optical axis of the prisms in the polarization separation section 103 is set to be substantially the same as a width H of any of the rows 117 of minute lenses. Particularly, it is more preferable to make the distance d coincide with the widest width H. This enables light from the light source 106 to be converted to polarized light without being wasted.

As is clear from FIG. 1, it is desirable to position an optical axis 101a of the light source section 101 and the first lens plate 108 at positions shifted about one and a half times of the distance d between the two planes with respect to the system optical axis 150. That is to say, in FIG. 1, it is preferable that an equation W=1.5d holds where W represents the distance between the optical axis 101a of the light source section 101 and the system optical axis 150. This enables light from the light source 106 to be converted to polarized light without being wasted. In this case, when the above-mention shifting amount W with respect to the system optical axis 150 cannot be secured due to space limitation or the like, for example, the shifting amount W can be supplemented by shifting the axes of the rectangular lenses 109 in the first lens plate 108.

SECOND EMBODIMENT

A second embodiment of a polarized-light illumination unit according to the present invention will be explained with reference to the drawings.

Figure 8:
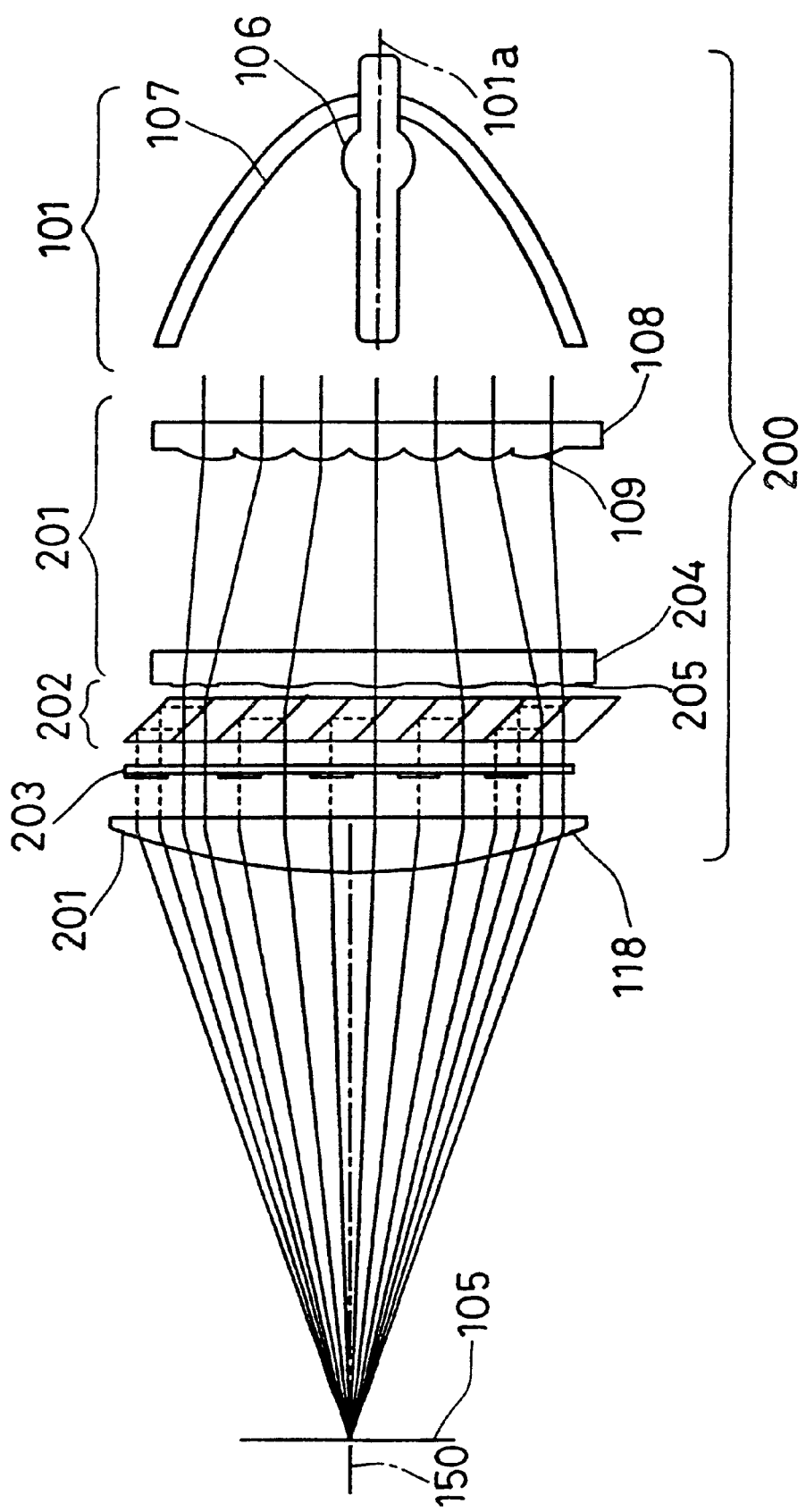
FIG. 8 shows a schematic configuration of a polarized-light illumination unit of a second embodiment of the present invention.

FIG. 8 shows a schematic structural example of the second embodiment of a polarized-light illumination unit according to the present invention. A polarized-light illumination unit 200 of the present embodiment comprises, along the system optical axis 150; a light source section 101, an integrator optical system 201, a polarization separation section 202, and a polarization conversion section 203. Light emitted from the light source section 101 reaches a rectangular illumination area 105 through the integrator optical system 201, the polarization separation section 202, and the polarization conversion section 203. The integrator optical system 201 comprises a first lens plate 108, a second lens plate 204, and a condenser lens 118.

The light source section 101 comprises a light source 106 and a reflector 107. Randomly polarized light emitted from the light source 106 is reflected by the reflector 107 in one direction and then enters the integrator optical system 201. Any of a paraboloid, an ellipsoid, or a spherical surface can be used as a reflection surface of the reflector 107 depending on the design of the optical system.

The first lens plate 108 is a compound lens member in which a plurality of minute rectangular lenses 109 are arranged as shown in FIG. 2. Light that has entered the first lens plate 108 is gathered by respective rectangular lenses 109. The rectangular lenses 109 are designed so as to form illuminant images on the second lens plate 204.

Figure 9:
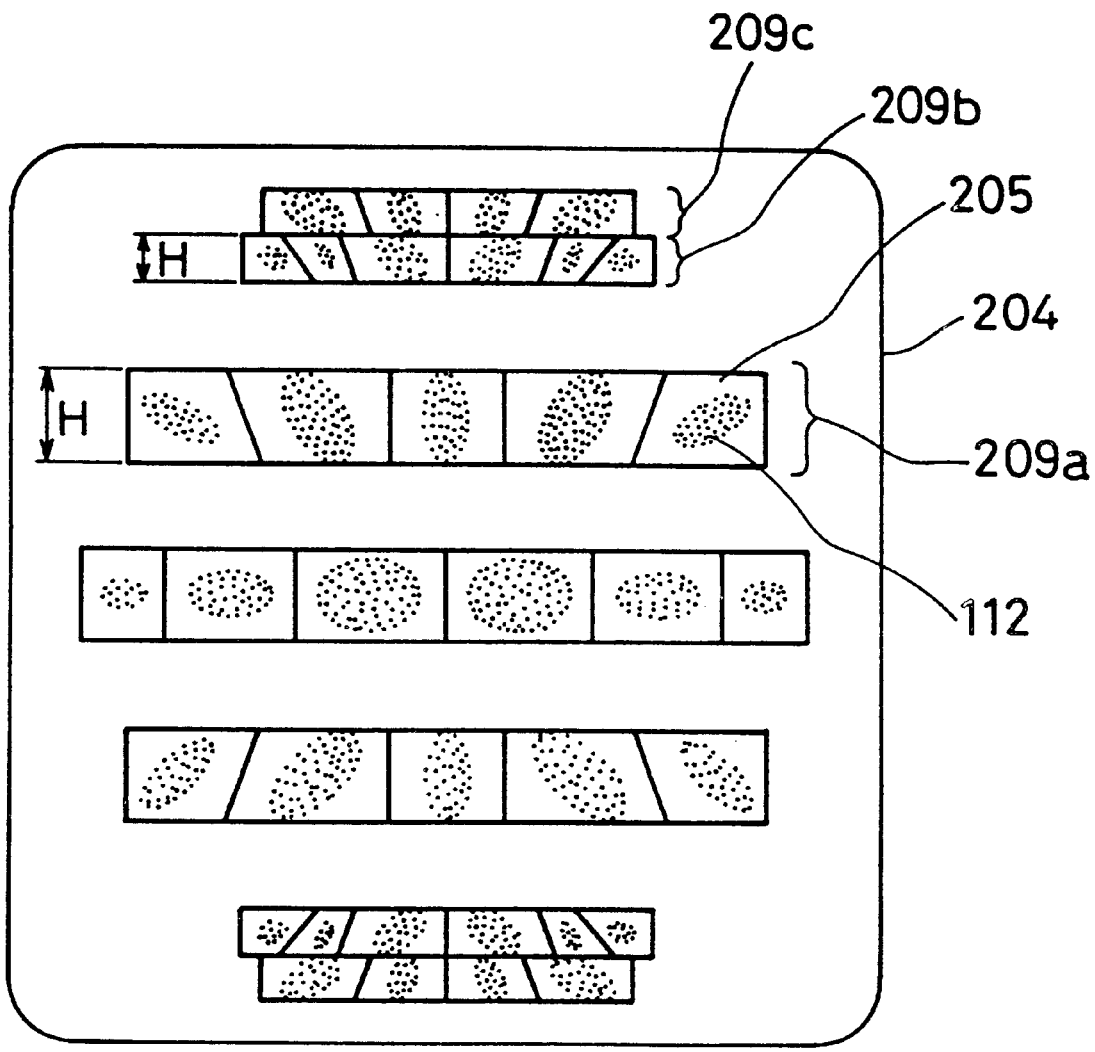
FIG. 9 is a plan view showing the appearance of a second lens plate in the unit shown in FIG. 8.

FIG. 9 shows the appearance of the second lens plate 204. The same number of minute lenses 205 as that of the rectangular lenses 109 formed in the first lens plate 108 are formed and arranged in the second lens plate 204. Respective minute lenses 205 correspond to respective rectangular lenses 109 one to one. The respective rectangular lenses 109 are designed to have shifted centers of aperture and curvature so as to form the illuminant images 112 in a plurality of rows on the second lens plate 204. The minute lenses 205 are arranged at the positions where the illuminant images 112 are formed by the rectangular lenses 109. Further, the areas and shapes of apertures of the minute lenses 205 are set corresponding to the sizes of the illuminant images 112.

The rows of the minute lenses 205 are formed in a plurality of strip shapes in the second lens plate 204 as shown in FIG. 9. Not all the rows have the same width H in a direction orthogonal to the longitudinal direction of each row (an effective aperture width of a minute lens 205 in the vertical direction in FIG. 9). As shown in the figure, rows with a different width H are present.

Figure 10:
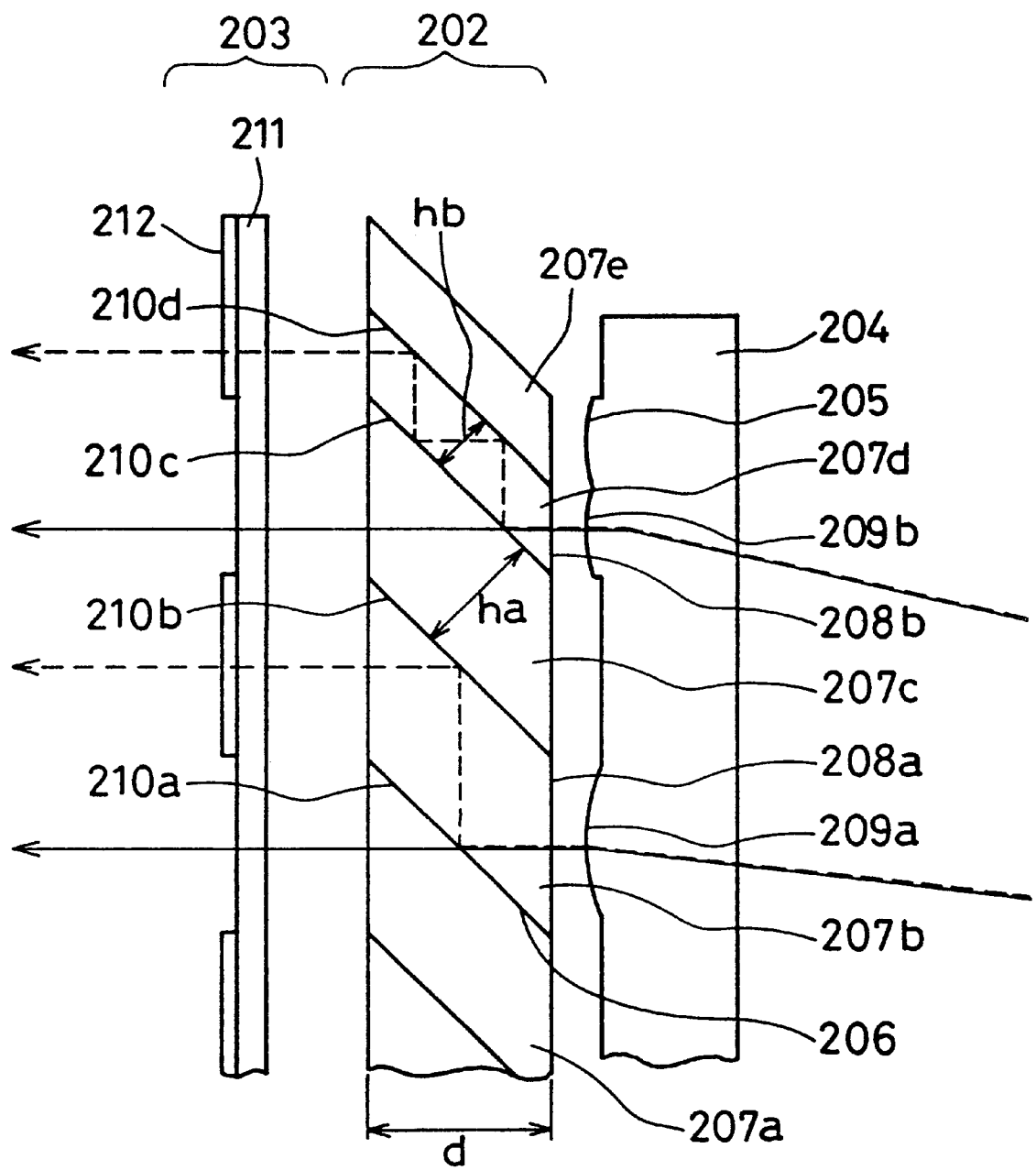
FIG. 10 is a side view showing the arrangement of a polarization separation section and the second lens plate in the unit shown in FIG. 8.

The light gathered by the rectangular lenses 109 in the first lens plate 108 passes through the minute lenses 205 in the second lens plate 204 and then enters the polarization separation section 202. FIG. 10 shows the arrangement of the polarization separation section 202 and the second lens plate 204.

The polarization separation section 202 is an aggregate of minute polarization beam splitters. Each polarization beam splitter (a prism) is formed of a quadratic prism having a parallelogramatic cross-section in a plane perpendicular to a polarization separation plane 206. Polarization separation films 206 are inserted between respective joining planes of prisms 207a, 207b, 207c, 207d, and 207e, thus forming polarization separation planes. These prisms are arranged so that rows 209a and 209b of the minute lenses 205 in the second lens plate 204 oppose apertures 208a and 208b. The polarization separation planes 206 are arranged obliquely to incident light (i.e. the system optical axis). In addition, the apertures 208a and 208b of the prisms are arranged perpendicularly to incident light (i.e. the system optical axis). Not all the prisms have the same distance h between two opposed planes parallel to the polarization separation planes 206 of the prisms (a distance h between two opposed sides of the parallelogram parallel to the polarization separation planes 206 of the prisms in FIG. 10). That is to say, the prisms 207a, 207b, and 207c have a distance ha between two opposed planes of each prism and the prisms 207d, and 207e have a distance hb between two opposed planes of each prism, which are different. On the other hand, all the prisms are formed to have the same distance d between two opposed planes perpendicular to the system optical axis of each prism. Furthermore, the thickness of the prisms is determined so that widths (lengths in the vertical direction in FIG. 10) of the apertures 208a and 208b coincide with the widths H of rows of the minute lenses 205, which oppose the apertures respectively, in the second lens plate 204.

The outgoing light from the row 209a (FIGS. 9 and 10) in the rows of minute lenses in the second lens plate 204 enters the aperture 208a in the polarization separation section 202 and then is incident on a polarization separation film 210a. At the film 210a, the incident light is separated into transmitted light and reflected light depending on its polarization direction. The transmitted light passes through the polarization separation section 202 and then enters the polarization conversion section 203. In this case, a ray of light passes through an area where a $\lambda/2$ plate 212 is not formed and therefore is not particularly affected in the area. Then, the ray of light passes through the condenser lens 118 and illuminates the illumination area 105. On the other hand, the reflected light is reflected again by a polarization separation film 210b that is arranged in parallel to the polarization separation film 210a. Then, the reflected light passes through the polarization separation section 202 and enters the strip-like $\lambda/2$ plate 212 that is placed on a base glass 211 and is set to rotate the polarization direction of incident light 90 degrees. The light whose polarization direction has been converted in the $\lambda/2$ plate 212 passes through the condenser lens 118 and illuminates the illumination area 105.

The outgoing light from the row 209b (FIGS. 9 and 10) in the rows of minute lenses in the second lens plate 204 enters the aperture 208b in the polarization separation section 202 and then is incident on a polarization separation film 210c. At the film 210c, the incident light is separated into transmitted light and reflected light depending on its polarization direction. The transmitted light passes through the polarization separation section 202 and then enters the polarization conversion section 203 as in the above. In this case, a ray of light passes through an area where the $\lambda/2$ plate 212 is not formed and therefore is not particularly affected in the area. Then, the ray of light passes through the condenser lens 118 and illuminates the illumination area 105. On the other hand, the reflected light is reflected by a polarization separation film 210d that is arranged in parallel to the polarization separation film 210c, is reflected again by the polarization separation films 210c and 210d, and then enters the $\lambda/2$ plate 212. The light whose polarization direction has been converted in the $\lambda/2$ plate 212 passes through the condenser lens 118 and illuminates the illumination area 105.

By forming a polarized-light illumination unit as described above, polarization directions of randomly polarized light emitted from the light source 106 can be aligned in one direction efficiently, and at the same time the integrator optical system enables uniform illumination, which can be realized substantially without increasing the unit size.

The polarization separation section 202 is an aggregate of prisms that have the same length d in the system optical axis direction. Therefore, laminating a plurality of large prism materials with a predetermined thickness h and slicing it obliquely to the lamination direction enable mass production of the polarization separation sections. Furthermore, all the surfaces can be polished and coated at one time, thus suppressing cost increase to the minimum.

The apertures of the minute lenses 205 in the second lens plate 204 can be formed corresponding to the sizes of illuminant images, thus reducing the size of the second lens plate 204 to the minimum. Therefore, the parallelism of lights reaching the illumination area 105 can be improved (the illumination f-number can be increased), thus expanding the application range as an illumination unit for various optical instruments.

In the aforementioned embodiment, the integrator optical system 201, the polarization separation section 202, the polarization conversion section 203, and the condenser lens 118 (a part of the integrator optical system 201) are arranged separately. However, the spaces between respective members are not required, and therefore the members also can be combined into one component.

In the above-mentioned embodiment, the polarization conversion section 203 was explained with reference to the λ/2 plate 212. However, the polarization conversion section 203 is not always limited to this, and any means that can convert the polarization direction of incident light may be used. In the aforementioned embodiment, to align the polarization directions, the polarization direction of the outgoing light (s-polarized light in the polarization separation plane) reflected once in the polarization separation section 202 is converted. However, the polarization conversion section 203 may be designed so as to act on the non-reflected outgoing light (p-polarized light in the polarization separation plane) and not to act on the reflected outgoing light from the polarization separation section. Further, the polarization conversion section 203 also may be designed so as to act differently on the reflected outgoing light and the non-reflected outgoing light from the polarization separation section, thus aligning the polarization directions of both the outgoing lights.

In the polarization separation section 202, it is preferable that the equation ha=nhb (wherein n represents a natural number) holds between a distance ha between two opposed planes parallel to the polarization separation films 206 of the prisms 207a, 207b, and 207c and a distance hb between two opposed planes parallel to the polarization separation films 206 of the prisms 207d, and 207e, because in that case illuminant images can be formed on outgoing surfaces in the polarization separation section without gaps. In this case, when the thicker prisms 207a, 207b, and 207c are formed by laminating n formation materials (photorefractive materials) of the thinner prisms 207d, and 207e, all the materials used can be formed so as to have one thickness, which is advantageous in process and enables cost reduction. Needless to say, the joining planes in this case are required not to provide an optical effect to incident light.

The condenser lens 118 is not always limited to a spherical lens and can be formed of a Fresnel lens or an aggregate of prisms.

In the present embodiment, the surface 210b is a polarization separation plane. However, it also can be a reflection-mirror plane.

THIRD EMBODIMENT

A third embodiment of a polarized-light illumination unit according to the present invention will be explained with reference to the drawings.

Figure 11:
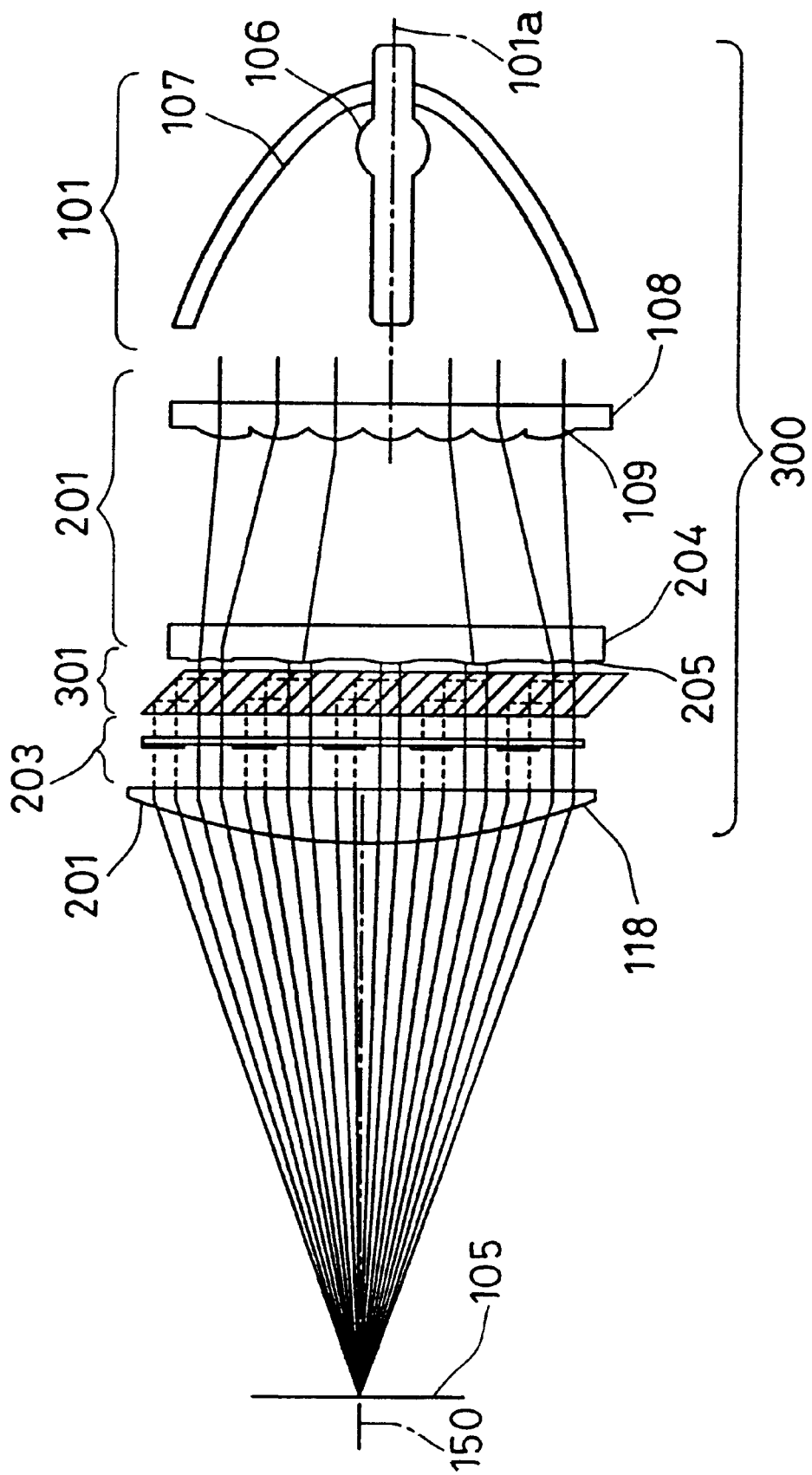
FIG. 11 shows a schematic configuration of a polarized-light illumination unit of a third embodiment of the present invention.

FIG. 11 shows a schematic structural example of the third embodiment of a polarized-light illumination unit according to the present invention. A polarized-light illumination unit 300 of the present embodiment comprises, along a system optical axis 150: a light source section 101; an integrator optical system 201; a polarization separation section 301; and a polarization conversion section 203. Light emitted from the light source section 101 reaches a rectangular illumination area 105 through the integrator optical system 201, the polarization separation section 301, and the polarization conversion section 203. The integrator optical system 201 comprises a first lens plate 108, a second lens plate 204, and a condenser lens 118.

The light source section 101 comprises a light source 106 and a reflector 107. Randomly polarized light emitted from the light source 106 is reflected by the reflector 107 in one direction and then enters the integrator optical system 201. Any of a paraboloid, an ellipsoid, or a spherical surface can be used as a reflection surface of the reflector 107 depending on the design of the optical system.

The first lens plate 108 is a compound lens member in which a plurality of minute rectangular lenses 109 are arranged as shown in FIG. 2. Light that has entered the first lens plate 108 is gathered by respective rectangular lenses 109. The rectangular lenses 109 are designed so as to form illuminant images on the second lens plate 204.

FIG. 9 shows the appearance of the second lens plate 204. The same number of minute lenses 205 as that of the rectangular lenses 109 formed in the first lens plate 108 are formed and arranged in the second lens plate 204. Respective minute lenses 205 correspond to respective rectangular lenses 109 one to one. The respective rectangular lenses 109 are designed to have shifted centers of aperture and curvature so as to form the illuminant images 112 in a plurality of rows on the second lens plate 204. The minute lenses 205 are arranged at the positions where the illuminant images 112 are formed by the rectangular lenses 109. Further, the areas and shapes of apertures of the minute lenses 205 are set corresponding to the sizes of the illuminant images 112.

The rows of the minute lenses 205 are formed in a plurality of strip shapes in the second lens plate 204 as shown in FIG. 9. Not all the rows have the same width H in a direction orthogonal to the longitudinal direction of each row (an effective aperture width of a minute lens 205 in the vertical direction in FIG. 9). As shown in the figure, rows with a different width H are present.

Figure 12:
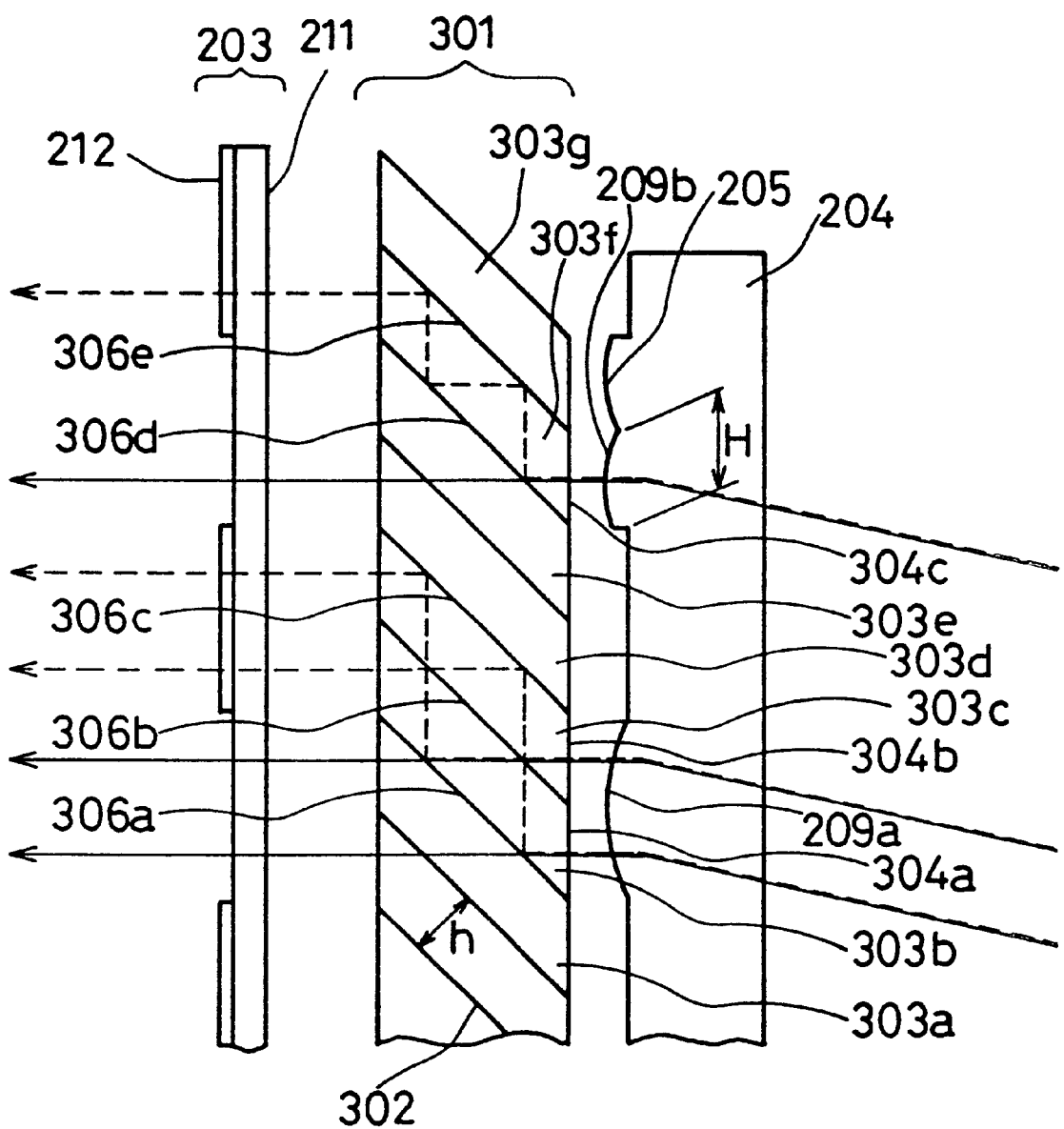
FIG. 12 is a side view showing the arrangement of a polarization separation section and a second lens plate in the unit shown in FIG. 11.

The light gathered by the rectangular lenses 109 in the first lens plate 108 passes through the minute lenses 205 in the second lens plate 204 and then enters the polarization separation section 301. FIG. 12 shows the arrangement of the polarization separation section 301 and the second lens plate 204.

The polarization separation section 301 is an aggregate of minute polarization beam splitters having the same shape. The polarization beam splitters (prisms) are formed of quadratic prisms having a parallelogramatic cross-section in a plane perpendicular to a polarization separation plane 302. Polarization separation films 302 are inserted between respective joining planes of prisms 303a, 303b, 303c, 303d, 303e, 303f, and 307g, thus forming polarization separation planes. These prisms are arranged so that rows 209a and 209b of the minute lenses 205 in the second lens plate 204 oppose apertures 304a and 304b, and 304c, respectively. Furthermore, the thickness of the prisms is determined so that widths (lengths in the vertical direction in FIG. 12) of the apertures 304a, 304b, and 304c coincide with the width H of the minute-lens row 209b that has the narrowest width H in the second lens plate 204. The polarization separation planes 302 are arranged obliquely to incident light (i.e. the system optical axis). Further, the apertures 304a, 304b, and 304c of the prisms are arranged perpendicularly to incident light (i.e. the system optical axis).

The outgoing light from the row 209a in the rows of minute lenses in the second lens plate 204 enters the polarization separation section 301. The width H of the row 209a is twice as wide as the width of the apertures 304a, 304b, and 304c of the prisms. Therefore, the outgoing light from the row 209a is divided to enter the aperture 304a and the aperture 304b separately.

The outgoing light from the lower half of the row 209a enters the aperture 304a and then is incident on the polarization separation film 306a. At the film 306a, the incident light is separated into transmitted light and reflected light depending on its polarization direction. The transmitted light passes through the polarization separation section 301 and then enters the polarization conversion section 203. In this case, a ray of light passes through an area where a $\lambda/2$ plate 212 is not formed and therefore is not particularly affected in the area. Then, the ray of light passes through the condenser lens 118 and illuminates the illumination area 105.

On the other hand, the reflected light is reflected again by a polarization separation film 306b that is arranged in parallel to the polarization separation film 306a, and then is reflected by the polarization separation films 306a and 306b again. Thus, the reflected light passes through the polarization separation section 301 and then enters the strip-like $\lambda/2$ plate 212 that is placed on a base glass 211 and is set to rotate the polarization direction of incident light 90 degrees. The light whose polarization direction has been converted in the $\lambda/2$ plate 212 passes through the condenser lens 118 and illuminates the illumination area 105.

The outgoing light from the upper half of the row 209a enters the aperture 304b and is separated into transmitted light and reflected light depending on its polarization direction by the polarization separation film 306b. The transmitted light passes through the polarization separation section 301 and then enters the polarization conversion section 203. In this case, a ray of light passes through an area where the $\lambda/2$ plate 212 is not formed and therefore is not particularly affected in the area. Then, the ray of light passes through the condenser lens 118 and illuminates the illumination area 105. On the other hand, the reflected light is reflected again by a polarization separation film 306c that is arranged in parallel to the polarization separation film 306b and is reflected by the polarization separation films 306b and 306c again. Thus, the reflected light passes through the polarization separation section 301 and then enters the strip-like $\lambda/2$ plate 212 that is placed on the base glass 211 and is set to rotate the polarization direction of incident light 90 degrees. The light whose polarization direction has been converted in the $\lambda/2$ plate 212 passes through the condenser lens 118 and illuminates the illumination area 105.

Further, the outgoing light from the row 209b in the second lens plate 204 enters the polarization separation section 301. In this case, the width H of the row 209b is substantially the same as that of the apertures 304a, 304b, and 304c of the prisms, and therefore the whole outgoing light from the row 209b enters the aperture 304c. The outgoing light from the row 209b enters the aperture 304c and then is incident on a polarization separation film 306d. The incident light is separated into transmitted light and reflected light depending on its polarization direction by the polarization separation film 306d. Thus, the transmitted light passes through the polarization separation section 301 and then enters the polarization conversion section 203. In this case, a ray of light passes through an area where the $\lambda/2$ plate 212 is not formed and therefore is not particularly affected in the area. Then, the ray of light passes through the condenser lens 118 and illuminates the illumination area 105.

The reflected light is reflected again by a polarization separation film 306e that is arranged in parallel to the polarization separation film 306d and is reflected by the polarization separation films 306d and 306e again. Then, the reflected light passes through the polarization separation section 301 and enters the strip-like $\lambda/2$ plate 212 that is placed on the base glass 211 and is set to rotate the polarization direction of incident light 90 degrees. The light whose polarization direction has been converted in the $\lambda/2$ plate 212 passes through the condenser lens 118 and illuminates the illumination area 105.

By forming a polarized-light illumination unit as described above, polarization directions of randomly polarized light emitted from the light source 106 can be aligned in one direction efficiently, and at the same time the integrator optical system 201 enables uniform illumination, which can be realized substantially without increasing the unit size.

The polarization separation section 301 is an aggregate of the same prisms. Therefore, laminating a plurality of large prism materials with a predetermined thickness h and slicing it obliquely to the lamination direction enable mass production of the polarization separation sections. Furthermore, all the surfaces can be polished and coated at one time, thus suppressing cost increase to the minimum.

The apertures of the minute lenses 205 in the second lens plate 204 can be formed corresponding to the sizes of illuminant images, thus reducing the size of the second lens plate 204 to the minimum. Therefore, the parallelism of lights reaching the illumination area 105 can be improved (the illumination f-number can be increased), thug expanding the application range as an illumination unit for various optical instruments.

In the aforementioned embodiment, the integrator optical system 201, the polarization separation section 301, the polarization conversion section 203, and the condenser lens 118 (a part of the integrator optical system 201) are arranged separately, However, the spaces between respective members are not required, and therefore the members also can be combined into one component.

In the above-mentioned embodiment, the polarization conversion section 203 was explained with reference to the $\lambda/2$ plate 212. However, the polarization conversion section 203 is not always limited to this, and any means that can convert the polarization direction of incident light may be used. In the aforementioned embodiment, to align the polarization directions, the polarization direction of the outgoing light (s-polarized light in the polarization separation plane) reflected once in the polarization separation section 301 is converted. However, the polarization conversion section 203 may be designed so as to act on the non-reflected outgoing light (p-polarized light in the polarization separation plane) and not to act on the reflected outgoing light from the polarization separation section. Further, the polarization conversion section 203 may be designed so as to act differently on the reflected outgoing light and the non-reflected outgoing light from the polarization separation section, thus aligning the polarization directions of both the outgoing lights.

In the present embodiment, all the parallelogramatic prisms forming the polarization separation section 301 have the same shape, thus enabling cost reduction in view of the material and process.

The condenser lens 118 is not always limited to a spherical lens as in the above-mentioned embodiment and can be formed of a Fresnel lens or an aggregate of prisms.

In the present embodiment, the size of the parallelogramatic prisms forming the polarization beam splitters is set so that the width of the apertures 304a, 304b, and 304c of the prisms corresponds to the width H of the effective aperture of a row (209b in the present embodiment) with the narrowest width in the rows of the minute lenses 205 in the second lens plate 204. However, the width of the apertures 304a, 304b, and 304c is not required to coincide with the width H of the minute-lens row. For example, when the width of the apertures 304a, 304b, and 304c has a value obtained by dividing the width H by a natural number n, the polarization beam splitters can be formed. This is obvious, since light was separated depending on its polarization direction in the polarization separation section without any problems in the above-mentioned description even when the outgoing light from the minute-lens row 209a in the second lens plate 204 is divided into two and enters two prisms.

Figure 13:
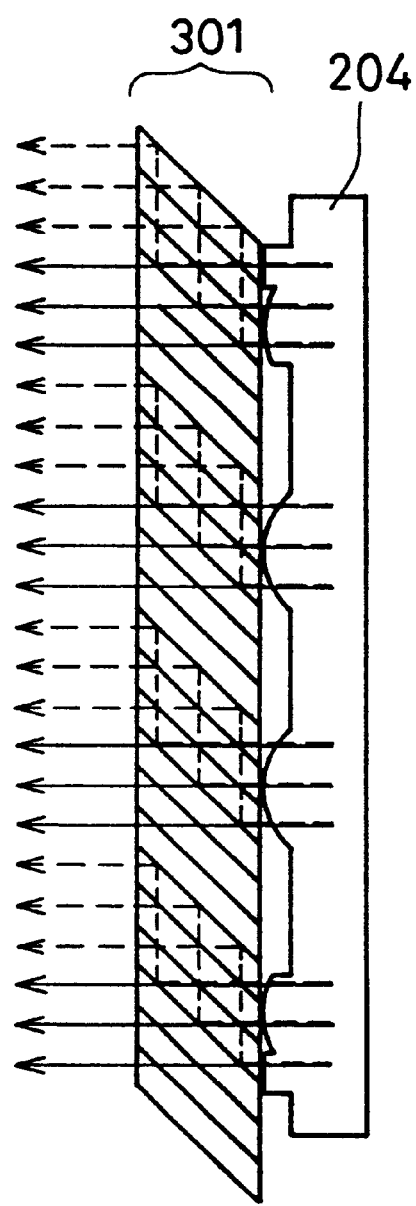
FIG. 13 is a side view showing the arrangement of the polarization separation section and a second lens plate with another configuration in the unit shown in FIG. 11.

In the above-mentioned embodiment, the lens rows of the minute lenses 205 in the second lens plate 204 include those with substantially the same width Has and those with the width H about twice as wide as that of the aperture of a polarization beam splitter. However, the present invention is not limited to this. As shown in FIG. 13, the present embodiment can be obtained even when minute-lens rows with the width H about three times as wide as that of an aperture are included. Generally, when applying this practically, the optimal configuration for the system can be obtained by combining rows with a width n times (n represents a natural number) as wide as that of an aperture suitably.

In the present embodiment, the surface 306c was a polarization separation plane. However, it also can be a reflection-mirror plane.

FOURTH EMBODIMENT

A fourth embodiment of a polarized-light illumination unit according to the present invention will be explained with reference to the drawings.

Figure 14:
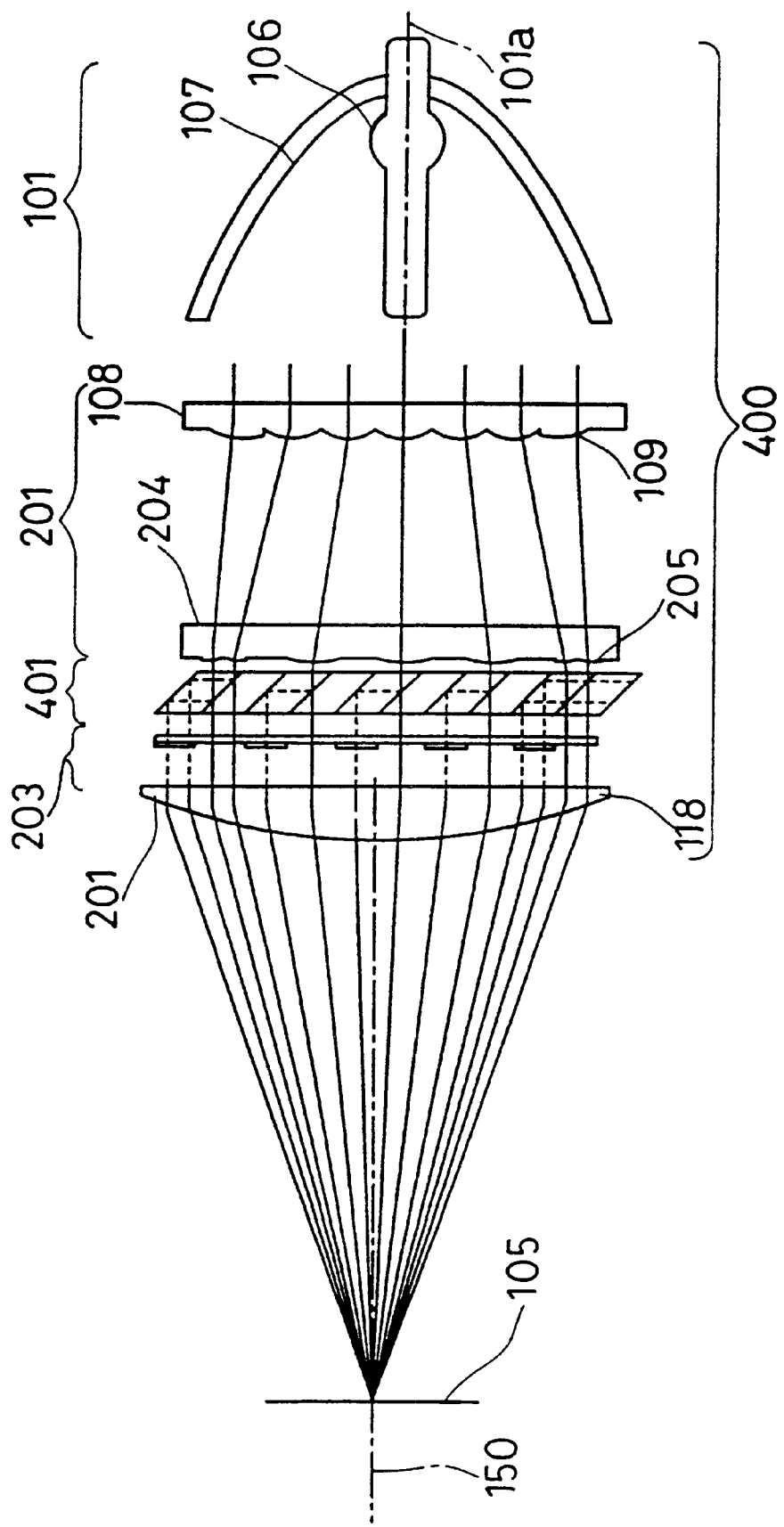
FIG. 14 shows a schematic configuration of a polarized-light illumination unit of a fourth embodiment of the present invention.

FIG. 14 shows a schematic structural example of the fourth embodiment of a polarized-light illumination unit according to the present invention. A polarized-light illumination unit 400 of the present embodiment comprises, along a system optical axis 150: a light source section 101; an integrator optical system 201; a polarization separation section 401; and a polarization conversion section 203. Light emitted from the light source section 101 reaches a rectangular illumination area 105 through the integrator optical system 201, the polarization separation section 401, and the polarization conversion section 203. The integrator optical system 201 comprises a first lens plate 108, a second lens plate 204, and a condenser lens 118.

The light source section 101 comprises a light source 106 and a reflector 107. Randomly polarized light emitted from the light source 106 is reflected by the reflector 107 in one direction and then enters the integrator optical system 201. Any of a paraboloid, an ellipsoid, or a spherical surface can be used as a reflection surface of the reflector 107 depending on the design of the optical system.

The first lens plate 108 is a compound lens member in which a plurality of minute rectangular lenses 109 are arranged as shown in FIG. 2. Light that has entered the first lens plate 108 is gathered by respective rectangular lenses 109. The rectangular lenses 109 are designed so as to form illuminant images on the second lens plate 204.

FIG. 9 shows the appearance of the second lens plate 204. The same number of minute lenses 205 as that of the rectangular lenses 109 formed in the first lens plate 108 are formed and arranged in the second lens plate 204. Respective minute lenses 205 correspond to respective rectangular lenses 109 one to one. The respective rectangular lenses 109 are designed to have shifted centers of aperture and curvature so as to form the illuminant images 112 in a plurality of rows on the second lens plate 204. The minute lenses 205 are arranged at the positions where the illuminant images 112 are formed by the rectangular lenses 109. Further, the areas and shapes of apertures of the minute lenses 205 are set corresponding to the sizes of the illuminant images 112.

The rows of the minute lenses 205 are formed in a plurality of strip shapes in the second lens plate 204 as shown in FIG. 9. Not all the rows have the same width H in a direction orthogonal to the longitudinal direction of each row (an effective aperture width of a minute lens 205 in the vertical direction in FIG. 9). However, minute-lens rows 209b and 209c that have narrow widths H are formed adjacently as shown in the figure, which form a minute-lens group as a whole. A width H in a direction orthogonal to the longitudinal direction of the minute-lens group (the entire aperture width of the minute-lens group in the vertical direction in FIG. 9) is designed to be substantially the same width H of a minute-lens row 209a. That is to say, the minute lenses 205 in the second lens plate 204 of the present embodiment are arranged so as to form a plurality of rows or groups. Further, the minute lenses 205 are formed so that all the widths in the direction orthogonal to the longitudinal direction of the rows or groups are substantially the same.

Figure 15:
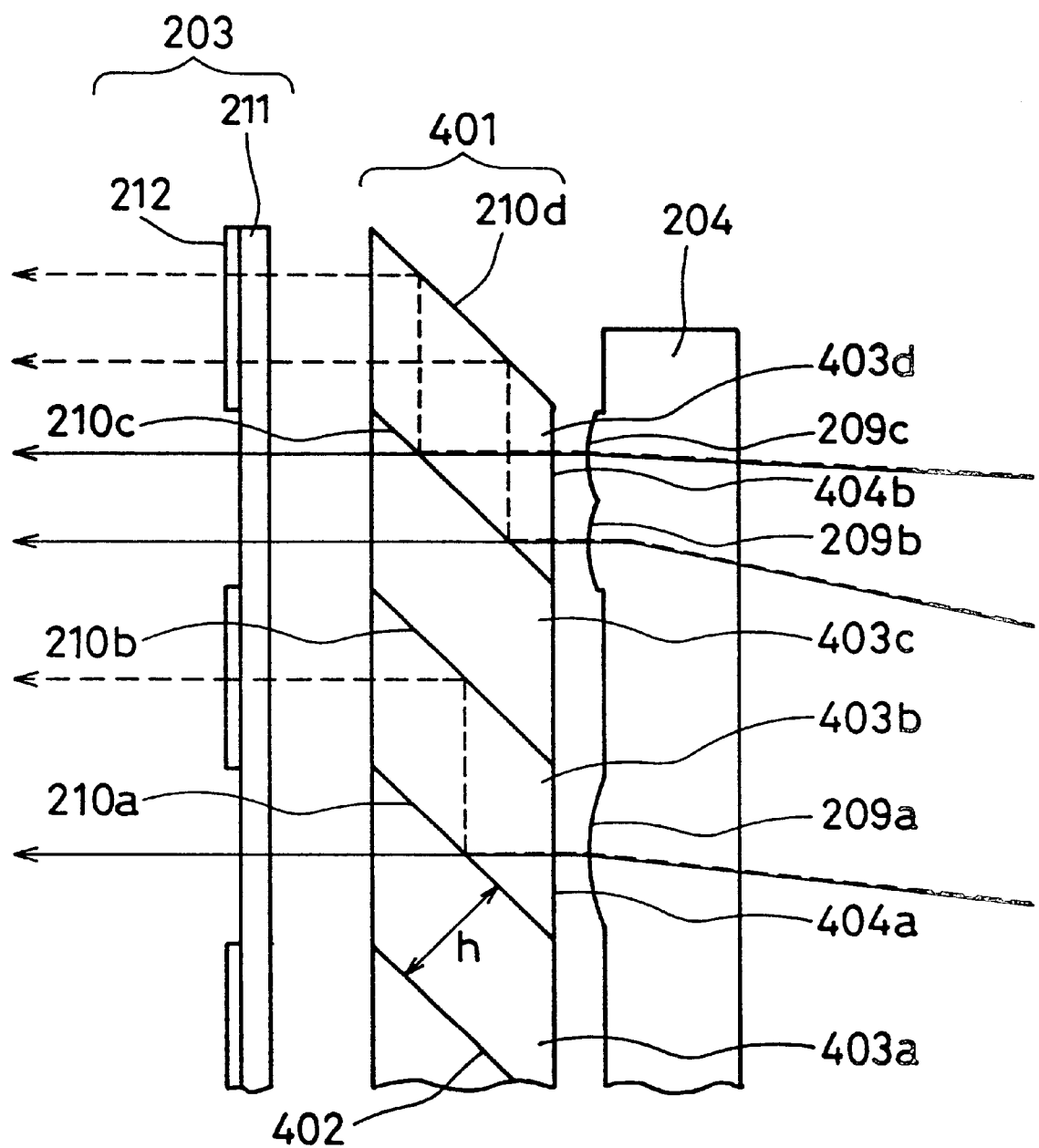
FIG. 15 is a side view showing the arrangement of a polarization separation section and a second lens plate in the unit shown in FIG. 14.

The light gathered by the rectangular lenses 109 in the first lens plate 108 passes through the minute lenses 205 in the second lens plate 204 and then enters the polarization separation section 401. FIG. 15 shows the arrangement of the polarization separation section 401 and the second lens plate 204.

The polarization separation section 401 is an aggregate of minute polarization beam splitters having the same shape. The polarization beam splitters (prisms) are formed of quadratic prisms having a parallelogramatic cross-section in a plane perpendicular to a polarization separation plane 402. Polarization separation films 402 are inserted between respective joining planes of prisms 403a, 403b, 403c, and 403d, thus forming polarization separation planes. These prisms are arranged so that rows or groups 209a, 209b, and 209c of the minute lenses 205 in the second lens plate 204 oppose apertures 404a and 404b. Furthermore, the thickness of the prisms is determined so that widths (lengths in the vertical direction in FIG. 15) of the apertures 404a and 404b coincide with the width H of the minute-lens row 209a that has the widest width H in the second lens plate 204. The polarization separation planes 402 are arranged obliquely to incident light (i.e. the system optical axis). Further, the apertures 404a and 404b of the prisms are arranged perpendicularly to incident light (i.e. the system optical axis).

The outgoing light from the row 209a in the rows of minute lenses in the second lens plate 204 enters the aperture 404a in the polarization separation section 401. The incident light is separated into transmitted light and reflected light by a polarization separation film 210a depending on its polarization direction. The transmitted light passes through the polarization separation section 401 and then enters the polarization conversion section 203. In this case, a ray of light passes through an area where a λ/2 plate 212 is not formed and therefore is not particularly affected in the area. Then, the ray of light passes through the condenser lens 118 and illuminates the illumination area 105. The reflected light is reflected again by a polarization separation film 210b that is arranged in parallel to the polarization separation film 210a, thus passes through the polarization separation section 401, and then enters the strip-like λ/2 plate 212 that is placed on a base glass 211 and is set to rotate the polarization direction of incident light 90 degrees. The light whose polarization direction has been converted in the λ/2 plate 212 passes through the condenser lens 118 and illuminates the illumination area 105.

The outgoing light from the row 209b forming a part of the minute-lens group in the second lens plate 204 enters the aperture 404b in the polarization separation section 401 at a position shifted downward from the center of the aperture 404b as shown in the figure. The incident light is separated into transmitted light and reflected light by a polarization separation film 210c depending on its polarization direction. The transmitted light passes through the polarization separation section 401 and then enters the polarization conversion section 203 as mentioned in the above. In this case, a ray of light passes through an area where the λ/2 plate 212 is not formed and therefore is not particularly affected in the area. Then, the ray of light passes through the condenser lens 118 and illuminates the illumination area 105. The reflected light is reflected by a polarization separation film 210d that is arranged in parallel to the polarization separation film 210c and then enters the λ/2 plate 212. The light whose polarization direction has been converted in the λ/2 plate 212 passes through the condenser lens 118 and illuminates the illumination area 105.

Further, the outgoing light from the row 209c forming a part of the minute-lens group in the second lens plate 204 enters the aperture 404b in the polarization separation section 401 at a position shifted upward from the center of the aperture 404b (a position different from that where the light from the row 209c enters) as shown in the figure. The incident light is separated into transmitted light and reflected light by the polarization separation film 210c depending on its polarization direction. The transmitted light passes through the polarization separation section 401 and then enters the polarization conversion section 203 as described in the above. In this case, a ray of light passes through an area where the λ/2 plate 212 is not formed and therefore is not particularly affected in the area. Then, the ray of light passes through the condenser lens 118 and illuminates the illumination area 105. The reflected light is reflected by the polarization separation film 210d that is arranged in parallel to the polarization separation film 210c and then enters the λ/2 plate 212. The light whose polarization direction has been converted in the λ/2 plate 212 passes through the condenser lens 118 and illuminates the illumination area 105.

By forming a polarized-light illumination unit as described above, polarization directions of randomly polarized light emitted from the light source 106 can be aligned in one direction efficiently, and at the same time the integrator optical system 201 enables uniform illumination, which can be realized substantially without increasing the unit size.

The polarization separation section 401 is an aggregate of the same prisms. Therefore, laminating a plurality of large prism materials with a predetermined thickness h and slicing it obliquely to the lamination direction enable mass production of the polarization separation sections. Furthermore, all the surfaces can be polished and coated at one time, thus suppressing cost increase to the minimum.

The apertures of the minute lenses 205 in the second lens plate 204 can be formed corresponding to the sizes of illuminant images, thus reducing the size of the second lens plate 204 to the minimum. Therefore, the parallelism of lights reaching the illumination area 105 can be improved (the illumination f-number can be increased), thus expanding-the application range as an illumination unit for various optical instruments.

In the aforementioned embodiment, the integrator optical system 201, the polarization separation section 401, the polarization conversion section 203, and the condenser lens 118 (a part of the integrator optical system 201) are arranged separately. However, the spaces between respective members are not required, and therefore the members also can be combined into one component.

In the above-mentioned embodiment, the polarization conversion section 203 was explained with reference to the λ/2 plate 212. However, the polarization conversion section 203 is not always limited to this, and any means that can convert the polarization direction of incident light may be used. In the aforementioned embodiment, to align polarization directions, the polarization direction of the outgoing light (s-polarized light in the polarization separation plane) reflected once in the polarization separation section 401 is converted. However, the polarization conversion section may be designed so as to act on the non-reflected outgoing light (p-polarized light in the polarization separation plane) and not to act on the reflected outgoing light from the polarization separation section. Further, the polarization conversion section may be designed so as to act differently on the reflected outgoing light and the non-reflected outgoing light from the polarization separation section, thus aligning the polarization directions of both the outgoing lights.

In the present embodiment, all the parallelogramatic prisms forming the polarization separation section 401 have the same shape, thus enabling cost reduction in view of the material and process.

The condenser lens 118 is not always limited to a spherical lens as in the above-mentioned embodiment and can be formed of a Fresnel lens or an aggregate of prisms.

In the present embodiment, the minute-lens group was formed by forming the minute-lens rows 209b and 209c adjacently. The group is formed so that its width coincides with the width H of the row 209a. In the present invention, however, the group is not required to have a structure in which a plurality of minute-lens rows can be distinguished clearly from each other as shown in FIG. 9.

For instance, instead of the minute-lens group consisting of the minute-lens rows 209b and 209c in FIG. 9, a minute lens group 209d as shown in FIG. 16(A) or a minute-lens group 209e as shown in FIG. 16(B) may be formed. In this case, the groups 209d and 209e are formed so as to have the same width H in the vertical direction on the paper as the width H of other minute-lens rows or groups (for example, the minute-lens row 209a).

Alternatively, instead of the second lens plate 204 in FIG. 9, a second lens plate 204' shown in FIG. 16(C) also can be used. Minute lenses 205 in the second lens plate 204' are arranged so as to form six minute-lens rows (or groups) 230a, 230b, 230c, 230d, 230e, and 230f. All the minute-lens rows (or groups) have the same effective aperture width H in the vertical direction on the paper. In FIG. 16(C), illuminant images formed by the first lens plate are omitted for simplifying the figure.

As shown in FIG. 16(C), as long as the minute lenses 205 in the second lens plate correspond to the rectangular lenses 109 in the first lens plate one to one, the number of the minute-lens rows or groups in the second lens plate (for example, six rows in FIG. 16(C)) is not required to coincide with that of the rows of the rectangular lenses arranged in the first lens plate (for example, seven rows in FIG. 2).

Further, FIGS. 16(A), (B), and (C) show the arrangement of the minute lenses 205 conceptually. Needless to say, it is necessary to make the number of the minute lenses to coincide with the number of the rectangular lenses in the first lens plate.

Figure 16:
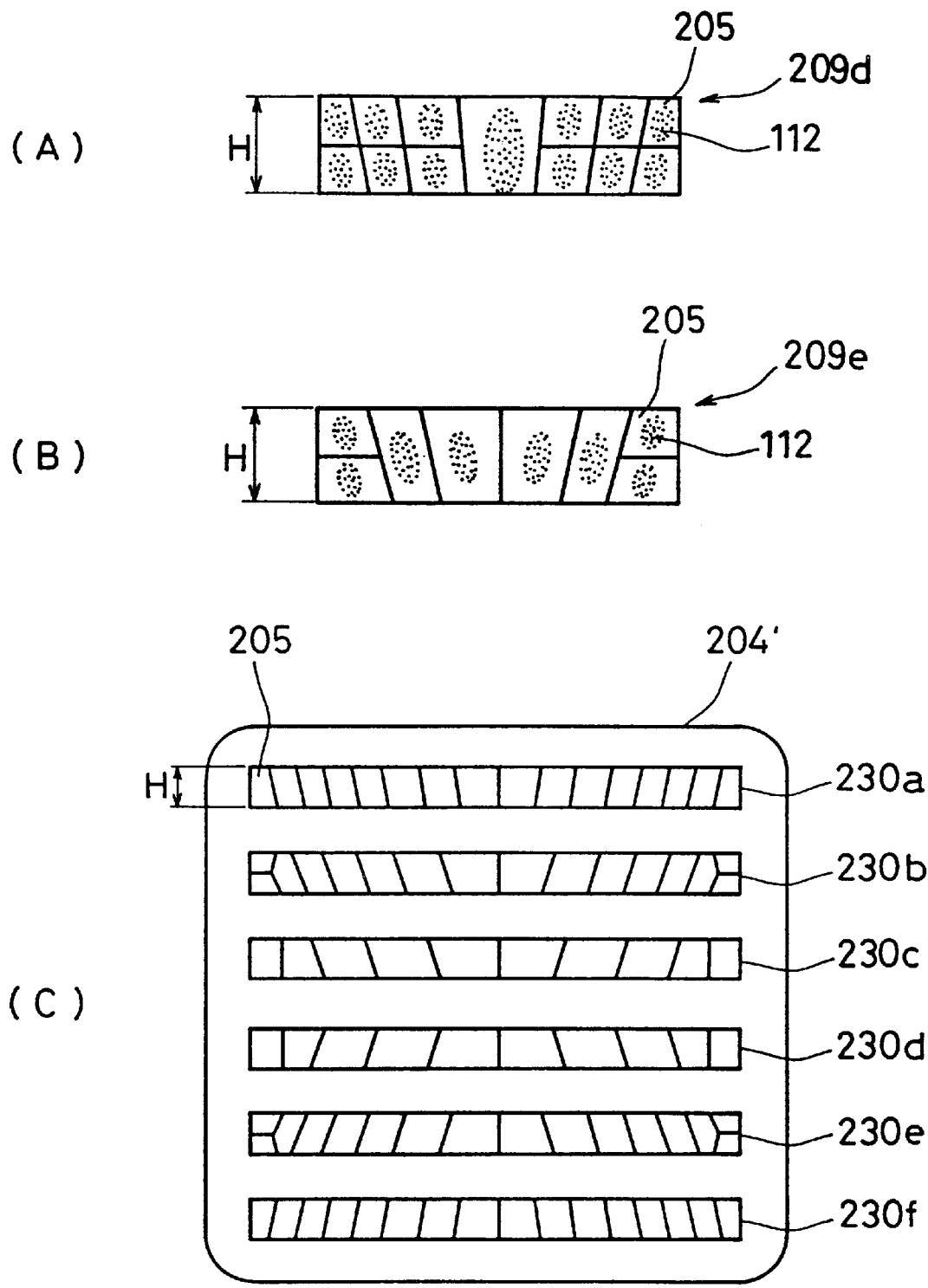
FIG. 16 is a plan view showing another example of the arrangement of minute lenses formed in the second lens plate.

Even when the minute-lens rows are formed as in FIG. 16, the same effect can be obtained by using the same polarization separation section 401 as that described in the present embodiment.

In the present embodiment, the surfaces 210b and 210d are polarization separation planes. However, they also can be reflection-mirror planes.

In the aforementioned embodiments 2 to 4, it is desirable to position if an optical axis 101a of the light source section 101 and the first lens plate 108 at the positions shifted with respect to the system optical axis 150 for about half of the distance d between the two planes orthogonal to the system optical axis of the prisms forming the polarization separation section. This enables light from the light source 106 to be converted to polarized light without being wasted. In this case, when the above-mention shifting amount with respect to the system optical axis 150 cannot be secured due to space limitation or the like, for example, the shifting amount can be supplemented by shifting the axes of the rectangular lenses 109 in the first lens plate 110.

FIFTH EMBODIMENT

Figure 17:
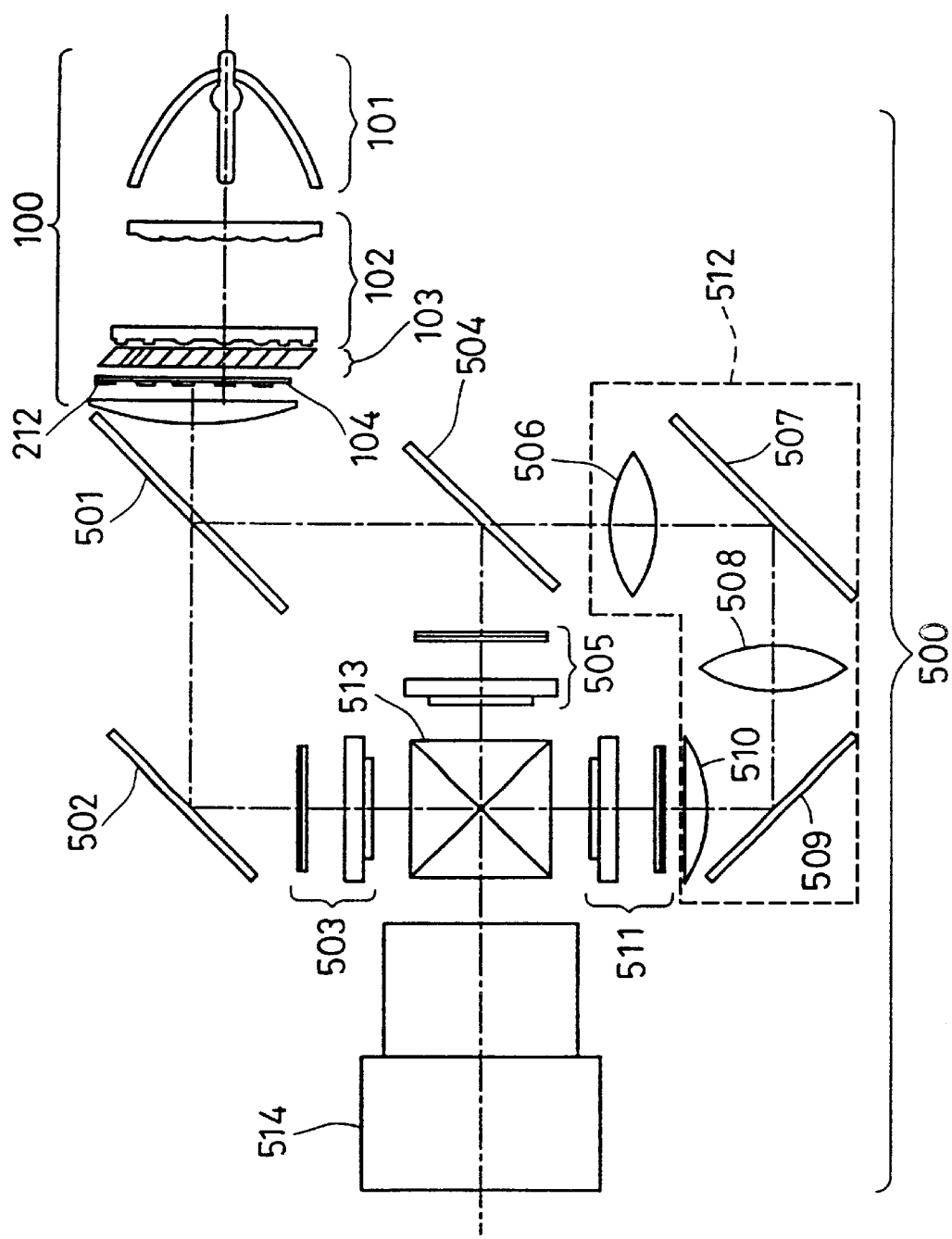
FIG. 17 shows a schematic configuration of a projection-type image display unit of a fifth embodiment of the present invention.

FIG. 17 shows an example in which the unit of the first embodiment is applied to a projection-type image display unit.

A projection-type image display unit 500 shown in FIG. 17 comprises a light source section 101 for emitting randomly polarized light in one direction. Randomly polarized light emitted from the light source section 101 is separated into two kinds of polarized light by an integrator optical system 102 and a polarization separation section 103. The polarization direction of one of the separated polarized lights is converted by a λ/2 plate 212 in a polarization conversion section 104 so that the polarization directions of both lights are aligned in one direction.

In a beam emitted from such a polarized-light illumination unit 100, first, a red light is transmitted and blue and green lights are reflected by a red-transmission dichroic mirror 501.

The red light is reflected by a reflection mirror 502 and reaches a first liquid crystal light valve 503. On the other hand, in the blue and green lights, the green light is reflected by a green-reflection dichroic mirror 504 and reaches a second liquid crystal light valve 505. The blue light passes through the green-reflection dichroic mirror 504 and is then guided to a third liquid crystal light valve 511 by a system 512 for guiding light. The system 512 is formed by adding reflection mirrors 507 and 509 to a relay lens system including a lens 506 at the incident side, a relay lens 508, and a lens 510 at the outgoing side. The first, second, and third liquid crystal light valves 503, 505, and 511 modulate color lights respectively. The color lights modulated according to picture signals corresponding to respective colors enter a dichroic prism 513 (a color synthesizer). The dichroic prism 513 comprises a red-reflection dielectric multilayer film and a blue-reflection dielectric multilayer film that intersect crosswise. The dichroic prism 513 synthesizes respective modulated beams. The beams synthesized here pass through a projection lens 514 (a projection optical system) to form a picture image on a screen 515 that is not shown in the figure.

The projection-type image display unit 500 formed in the above-mentioned manner employs liquid crystal panels that modulate one kind of polarized light. Therefore, when conventional randomly polarized light is guided to this type of liquid crystal light valves, half of the light is absorbed by polarizing plates and is changed to heat. Consequently, the light utilization rate is low and at the same time a large cooling system having a high noise level is required for suppressing the heat generation in the polarizing plates, which have been problems. However, in the projection-type image display unit 500 of the present embodiment, such problems can be solved to a great extent, since the polarized-light illumination unit of the first embodiment that can supply light whose polarization directions have been aligned is used.

Further, according to the present embodiment, the minute lenses 111 in the second lens plate 110 substantially can be optimized corresponding to the illuminant images 112 on the second lens plate 110, thus minimizing their aperture areas and shapes. Consequently, an apparent area of the second lens plate that is seen through the polarization conversion section also can be made small. The f-number of the projection lens is determined based on the apparent size of the second lens plate and the distance from a liquid crystal panel to the second lens plate. Therefore, when the second lens plate can be reduced in apparent size, it is not necessary to decrease the f-number, i.e. to brighten the projection lens. According to the present embodiment, even if the projection lens 514 is one used in a conventional unit in which polarization direction is not converted or one similar thereto, the increase in luminance of projection images can be attained adequately. Particularly, when the light valves are those using liquid crystal in which a wide incident angle causes the decrease in contrast, it is advantageous in improvement in image quality.

In the present embodiment, the light that had passed through the first, second, and third liquid crystal light valves 503, 505, and 511 was guided onto one optical axis by the dichroic prism 513 as a color synthesizer and thus was magnified and projected by one projection lens 514 of a projection optical system. However, the present invention is not particularly limited to this. For instance, without using the color synthesizer, projection lenses for respective color lights can be provided so as to magnify and project outgoing lights from the first, second, and third liquid crystal light valves 503, 505, and 511 for the respective color lights.

In the present embodiment, transmission-type liquid crystal was used as the light valves. However, the light valves are not limited to this. It is clear that completely the same effect can be obtained when using one to which polarization is applied.

SIXTH EMBODIMENT

Figure 18:
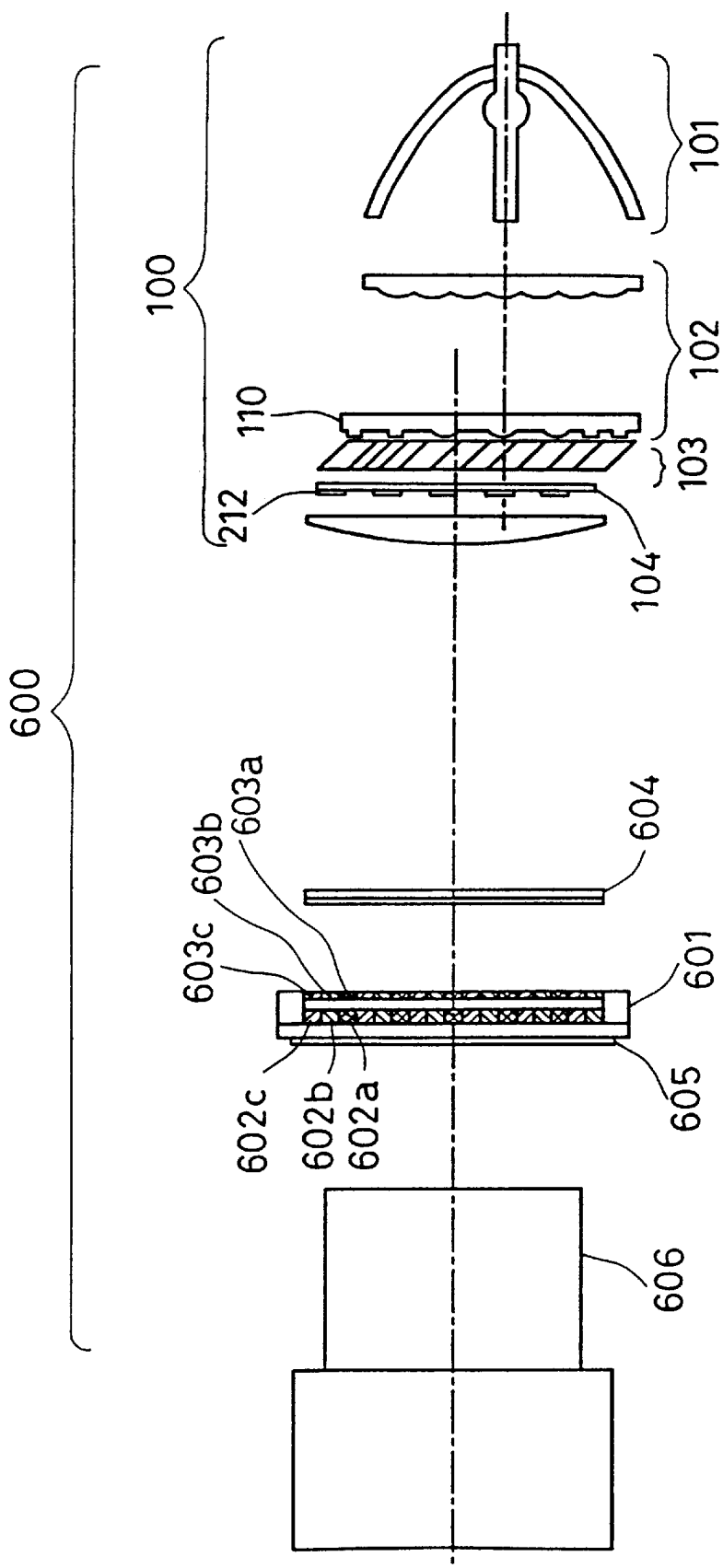
FIG. 18 shows a schematic configuration of a projection-type image display unit of a sixth embodiment of the present invention.

FIG. 18 shows another example in which the unit of the first embodiment is applied to a projection-type image display unit.

A projection-type image display unit 600 shown in FIG. 18 comprises a light source section 101 for emitting randomly polarized light in one direction. Randomly polarized light emitted from the light source section 101 is separated into two kinds of polarized light by an integrator optical system 102 and a polarization separation section 103. The polarization direction of one of the separated polarized lights is converted by a λ/2 plate 212 in a polarization conversion section 104 so that the polarization directions of both lights are aligned in one direction.

A beam emitted from such a polarized-light illumination unit 100 enters a liquid crystal light valve 601. The light valve 601 comprises a number of picture elements 602a, 602b, and 602c that can be driven independently corresponding to input signals for respective color lights. The respective picture elements are provided with color filters 603a, 603b, and 603c on the incident side. Each color filter transmits only the color light corresponding to the driving signal. The light valve 601 modulates incident light by converting its polarization direction similarly to that shown in the aforementioned fifth embodiment. On the incident side of the light valve 601, an incident-side polarizing plate 604 that transmits only the light with an arbitrary polarization direction is provided. On the outgoing side, an outgoing-side polarizing plate 605 is provided. In the lights that have passed through the light valve 601, the polarizing plate 605 transmits the light with a polarization direction from picture elements that should be projected on a screen and shields the light with the polarization direction orthogonal thereto. The light that has passed through the polarizing plate 605 passes through a projection lens 606 (a projection optical system). Thus, a picture image is formed on a screen 515 that is not shown in the figure.

Similarly in the present embodiment, when conventional randomly polarized light is guided to the liquid crystal light valve, half of the light is absorbed by the polarizing plates and is changed to heat as in the case of using three light valves. Consequently, the light utilization rate is low and at the same time a large cooling system having a high noise level is required for suppressing the heat generation in the polarizing plates, which have been problems. However, in the projection-type image display unit 600 of the present embodiment, such problems can be solved to a great extent, since the polarized-light illumination unit of the first embodiment that can supply light whose polarization directions have been aligned is used.

Similarly in the present embodiment, the minute lenses 111 in the second lens plate 110 substantially can be optimized corresponding to the illuminant images 112 on the second lens plate 110, thus minimizing their aperture areas and shapes. Consequently, an apparent area of the second lens plate that is seen through the polarization conversion section also can be made small. The f-number of the projection lens is determined based on the apparent size of the second lens plate and the distance from a liquid crystal panel to the second lens plate. Therefore, when the second lens plate can be reduced in apparent size, it is not necessary to decrease the f-number, i.e. to brighten the projection lens. According to the present embodiment, even if the projection lens 606 is one used in a conventional unit in which polarization direction is not converted or one similar thereto, the increase in luminance of projection images can be attained adequately. Particularly, when the light valve is one using liquid crystal in which a wide incident angle causes the decrease in contrast, it is advantageous in improvement in image quality.

Figure 19:
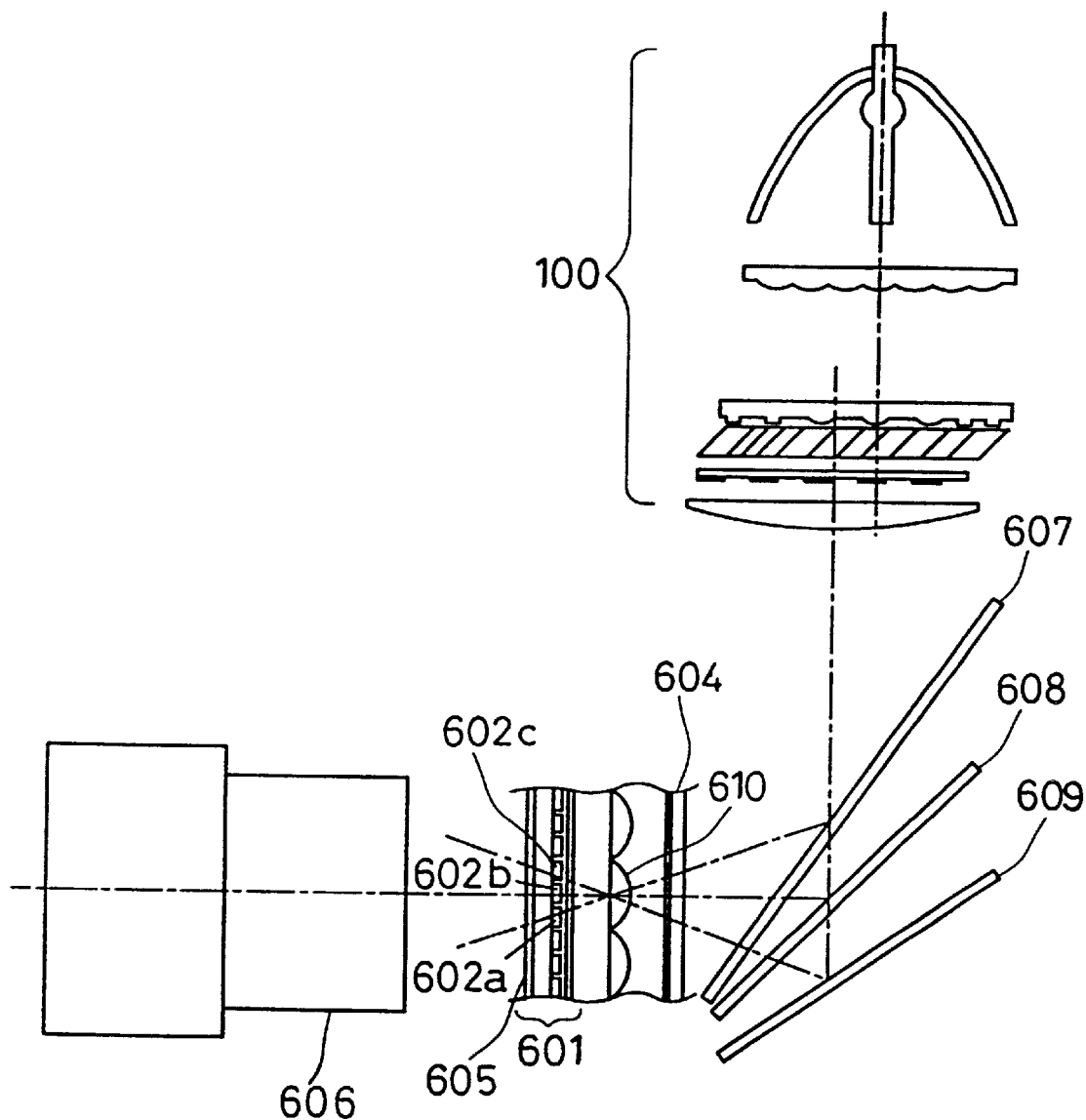
FIG. 19 shows a schematic configuration of a projection-type image display unit with another configuration of the sixth embodiment of the present invention.

In the present embodiment, colors were determined by the color filters 603a, 603b, and 603c. However, needless to say, by separating colors using dichroic mirrors 607 and 608 and a total reflection mirror 609, and providing one microlens 610 per 3 picture elements as shown in FIG. 19, the present embodiment can be applied to a single-plate projection-type image display unit without using color filters. In FIG. 19, the members having the same functions as in FIG. 18 are indicated with the same reference numbers and detailed description thereof is omitted.

SEVENTH EMBODIMENT

Figure 20:
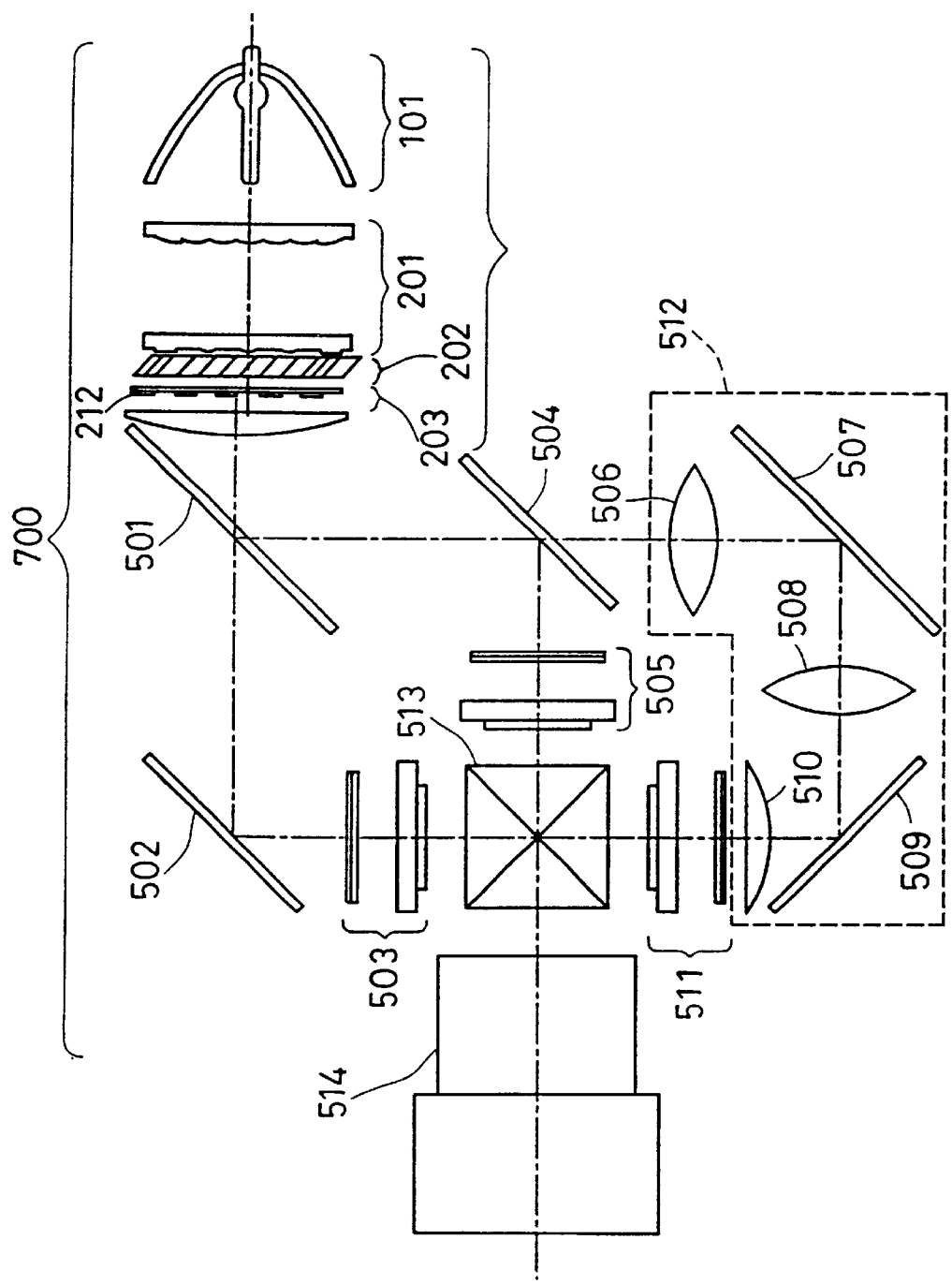
FIG. 20 shows a schematic configuration of a projection-type image display unit of a seventh embodiment of the present invention.

FIG. 20 shows an example in which the unit of the second embodiment is applied to a projection-type image display unit.

A projection-type image display unit 700 shown in FIG. 20 comprises a light source section 101 for emitting randomly polarized light in one direction. Randomly polarized light emitted from the light source section 101 is separated into two kinds of polarized light by an integrator optical system 201 and a polarization separation section 202. The polarization direction of one of the separated polarized lights is converted by a λ/2 plate 212 in a polarization conversion section 203 so that the polarization directions of both lights are aligned in one direction.

In a beam emitted from such a polarized-light illumination unit 200, first, a red light is transmitted and blue and green lights are reflected by a red-transmission dichroic mirror 501.

The red light is reflected by a reflection mirror 502 and reaches a first liquid crystal light valve 503. On the other hand, in the blue and green lights, the green light is reflected by a green-reflection dichroic mirror 504 and reaches a second liquid crystal light valve 505. The blue light passes through the green-reflection dichroic mirror 504 and is then guided to a third liquid crystal light valve 511 by a system 512 for guiding light. The system 512 is formed by adding reflection mirrors 507 and 509 to a relay lens system including a lens 506 at the incident side, a relay lens 508, and a lens 510 at the outgoing side. The first, second, and third liquid crystal light valves 503, 505, and 511 modulates color lights respectively. The color lights modulated according to picture signals corresponding to respective colors enter a dichroic prism 513 (a color synthesizer). The dichroic prism 513 comprises a red-reflection dielectric multilayer film and a blue-reflection dielectric multilayer film that intersect crosswise. The dichroic prism 513 synthesizes respective modulated beams. The beams synthesized here pass through a projection lens 514 (a projection optical system) to form a picture image on a screen 515 that is not shown in the figure.

The projection-type image display unit 700 formed in the above-mentioned manner employs liquid crystal panels that modulate one kind of polarized light. Therefore, when conventional randomly polarized light is guided to this type of liquid crystal light valves, half of the light is absorbed by polarizing plates and is changed to heat. Consequently, the light utilization rate is low and at the same time a large cooling system having a high noise level is required for suppressing the heat generation in the polarizing plates, which have been problems. However, in the projection-type image display unit 700 in the present embodiment, such problems can be solved to a great extent, since the polarized-light illumination unit of the second embodiment that can supply light whose polarization directions have been aligned is used.

Further, according to the present embodiment, the minute lenses 205 in the second lens plate 204 substantially can be optimized corresponding to the illuminant images 112 on the second lens plate 204, thus minimizing their aperture areas and shapes. Consequently, an apparent area of the second lens plate that is seen through the polarization conversion section also can be made small. The f-number of the projection lens is determined based on the apparent size of the second lens plate and the distance from a liquid crystal panel to the second lens plate. Therefore, when the second lens plate can be reduced in apparent size, it is not necessary to decrease the f-number, i.e. to brighten the projection lens. According to the present embodiment, even if the projection lens 514 is one used in a conventional unit in which polarization direction is not converted or one similar thereto, the increase in luminance of projection images can be attained adequately. Particularly, when the light valves are those using liquid crystal in which a wide incident angle causes the decrease in contrast, it is advantageous in improvement in image quality.

In the present embodiment as in the fifth embodiment, the light that had passed through the first, second, and third liquid crystal light valves 503, 505, and 511 was guided onto one optical axis by the dichroic prism 513 as a color synthesizer and thus was magnified and projected by one projection lens 514 of a projection optical system. However, the present invention is not particularly limited to this. For instance, without using the color synthesizer, projection lenses for respective color lights can be provided so as to magnify and project outgoing lights from the first, second, and third liquid crystal light valves 503, 505, and 511 for the respective color lights.

In the present embodiment, transmission-type liquid crystal was used as the light valves. However, the light valves are not limited to this. It is clear that completely the same effect can be obtained when using one to which polarization is applied.

When the polarized-light illumination unit 200 is used as an illumination unit to form a projection-type image display unit using light valves, besides three-plates type in which a color separation optical system is used and a light valve is provided for each color light as shown in FIG. 20, a single type (FIGS. 18 and 19) shown in the sixth embodiment using one light valve to obtain color display also can be employed.

EIGHTH EMBODIMENT

Figure 21:
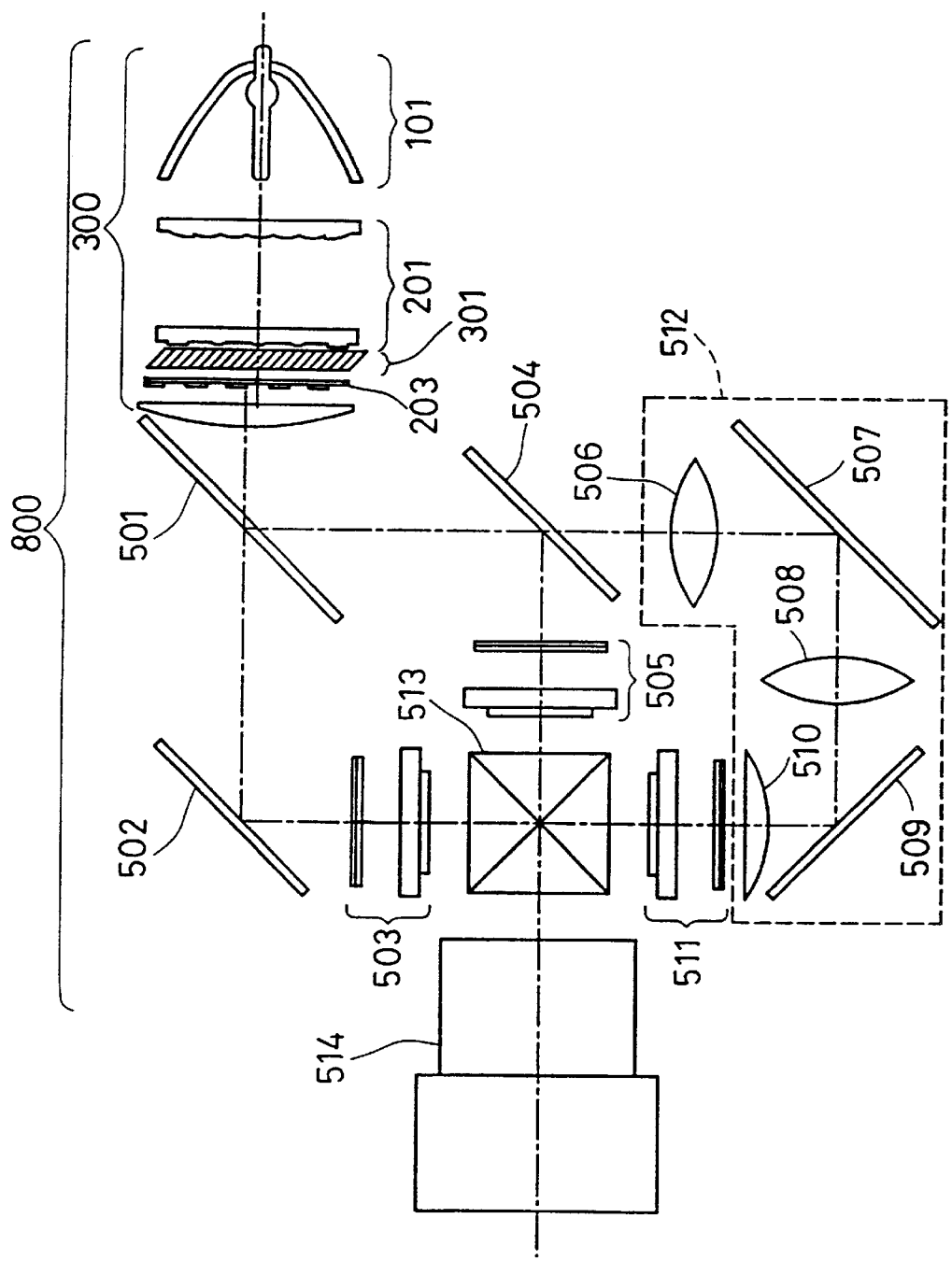
FIG. 21 shows a schematic configuration of a projection-type image display unit of an eighth embodiment of the present invention.

FIG. 21 shows an example in which the unit of the third embodiment is applied to a projection-type image display unit.

A projection-type image display unit 800 shown in FIG. 21 comprises a light source section 101 for emitting randomly polarized light in one direction. Randomly polarized light emitted from the light source section 101 is separated into two kinds of polarized light by an integrator optical system 201 and a polarization separation section 301. The polarization direction of one of the separated polarized lights is converted by a λ/2 plate 212 in a polarization conversion section 203 so that the polarization directions of both lights are aligned in one direction.

In a beam emitted from such a polarized-light illumination unit 300, first, a red light is transmitted and blue and green lights are reflected by a red-transmission dichroic mirror 501.

The red light is reflected by a reflection mirror 502 and then reaches a first liquid crystal light valve 503. On the other hand, in the blue and green lights, the green light is reflected by a green-reflection dichroic mirror 504 and reaches a second liquid crystal light valve 505. The blue light passes through the green-reflection dichroic mirror 504 and is then guided to a third liquid crystal light valve 511 by a system 512 for guiding light. The system 512 is formed by adding reflection mirrors 507 and 509 to a relay lens system including a lens 506 at the incident side, a relay lens 508, and a lens 510 at the outgoing side. The first, second, and third liquid crystal light valves 503, 505, and 511 modulate color lights respectively. The color lights modulated according to picture signals corresponding to respective colors enter a dichroic prism 513 (a color synthesizer). The dichroic prism 513 comprises a red-reflection dielectric multilayer film and a blue-reflection dielectric multilayer film that intersect crosswise. The dichroic prism 513 synthesizes respective modulated beams. The beams synthesized here pass through a projection lens 514 (a projection optical system) to form a picture image on a screen 515 that is not shown in the figure.

The projection-type image display unit 800 formed in the above-mentioned manner employs liquid crystal panels that modulate one kind of polarized light. Therefore, when conventional randomly polarized light is guided to this type of liquid crystal light valves, half of the light is absorbed by polarizing plates and is changed to heat. Consequently, the light utilization rate is low and at the same time a large cooling system having a high noise level is required for suppressing the heat generation in the polarizing plates, which have been problems. However, in the projection-type image display unit 800, such problems can be solved to a great extent, since the polarized-light illumination unit of the third embodiment that can supply light whose polarization directions have been aligned is used.

Further, according to the present embodiment, the minute lenses 205 in the second lens plate 204 substantially can be optimized corresponding to the illuminant images 112 on the second lens plate 204, thus minimizing their aperture areas and shapes. Consequently, an apparent area of the second lens plate that is seen through the polarization conversion section also can be made small. The f-number of the projection lens is determined based on the apparent size of the second lens plate and the distance from a liquid crystal panel to the second lens plate. Therefore, when the second lens plate can be reduced in apparent size, it is not necessary to decrease the f-number, i.e. to brighten the projection lens. According to the present embodiment, even if the projection lens 514 is one used in a conventional unit in which polarization direction is not converted or one similar thereto, the increase in luminance of projection images can be attained adequately. Particularly, when the light valves are those using liquid crystal in which a wide incident angle causes the decrease in contrast, it is advantageous in improvement in image quality.

In the present embodiment as in the fifth embodiment, the light that had passed through the first, second, and third liquid crystal light valves 503, 505, and 511 was guided onto one optical axis by the dichroic prism 513 as a color synthesizer and thus was magnified and projected by one projection lens 514 of a projection optical system. However, the present invention is not particularly limited to this. For instance, without using the color synthesizer, projection lenses for respective color lights can be provided so as to magnify and project outgoing lights from the first, second, and third liquid crystal light valves 503, 505, and 511 for the respective color lights.

In the present embodiment, transmission-type liquid crystal was used as the light valves. However, the light valves are not limited to this. It is clear that completely the same effect can be obtained when using one to which polarization is applied.

When the polarized-light illumination unit 300 is used as an illumination unit to form a projection-type image display unit using light valves, besides three-plates type in which a color separation optical system is used and a light valve is provided for each color light as shown in FIG. 21, a single type (FIGS. 18 and 19) shown in the sixth embodiment using one light valve to obtain color display also can be employed.

NINTH EMBODIMENT

Figure 22:
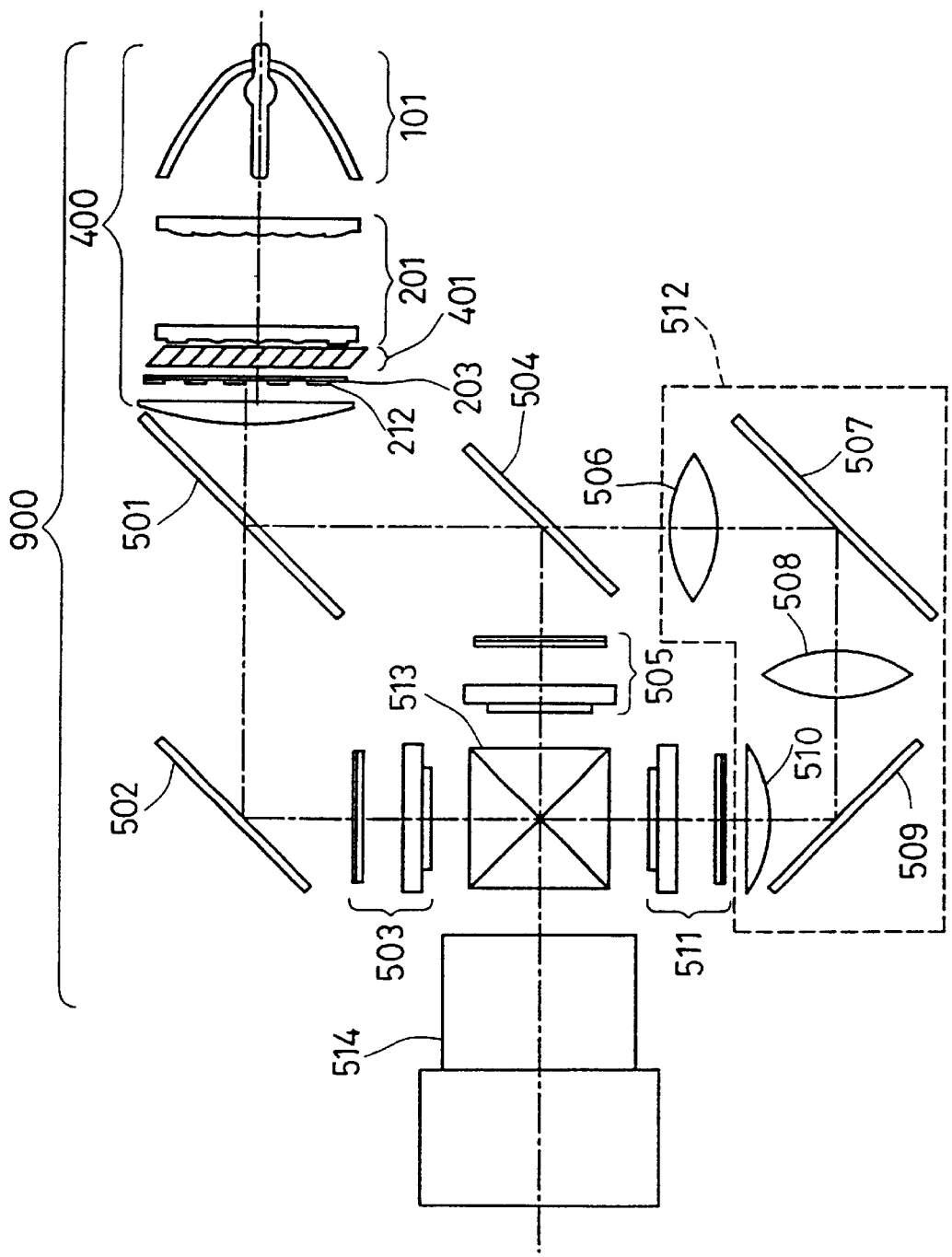
FIG. 22 shows a schematic configuration of a projection-type image display unit of ninth embodiment of the present invention.
Figure 23:
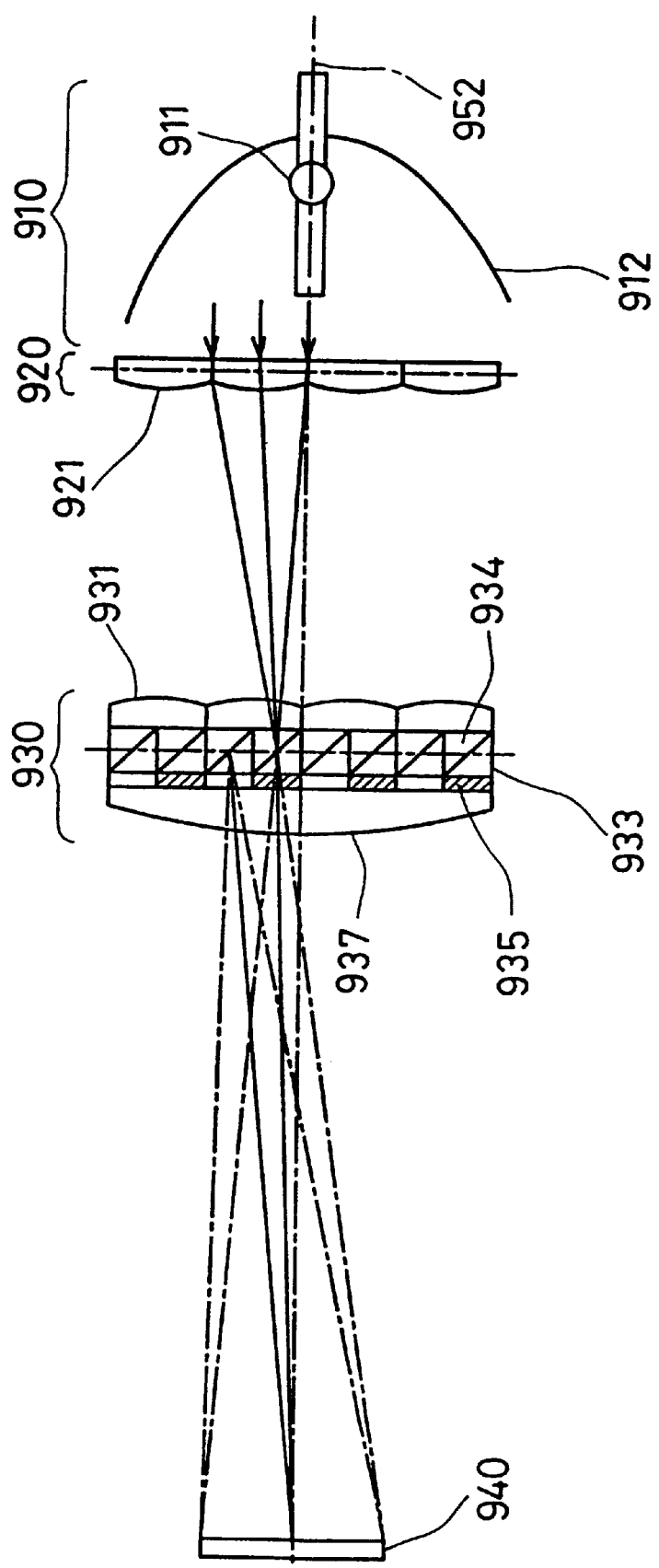
FIG. 23 shows a configuration example of a conventional polarized-light illumination unit.

FIG. 22 shows an example in which the unit of the fourth embodiment is applied to a projection-type image display unit.

A projection-type image display unit 900 shown in FIG. 22 comprises a light source section 101 for emitting randomly polarized light in one direction. Randomly polarized light emitted from the light source section 101 is separated into two kinds of polarized light by an integrator optical system 201 and a polarization separation section 401. The polarization direction of one of the separated polarized lights is converted by a $\lambda/2$ plate 212 in a polarization conversion section 203 so that the polarization directions of both lights are aligned in one direction.

In a beam emitted from such a polarized-light illumination unit 400, first, a red light is transmitted and blue and green lights are reflected by a red-transmission dichroic mirror 501.

The red light is reflected by a reflection mirror 502 and then reaches a first liquid crystal light valve 503. On the other hand, in the blue and green lights, the green light is reflected by a green-reflection dichroic mirror 504 and reaches a second liquid crystal light valve 505. The blue light passes through the green-reflection dichroic mirror 504 and is then guided to a third liquid crystal light valve 511 by a system 512 for guiding light. The system 512 is formed by adding reflection mirrors 507 and 509 to a relay lens system including a lens 506 at the incident side, a relay lens 508, and a lens 510 at the outgoing side. The first, second, and third liquid crystal light valves 503, 505, and 511 modulate color lights respectively. The color lights modulated according to picture signals corresponding to respective colors enter a dichroic prism 513 (a color synthesizer). The dichroic prism 513 comprises a red-reflection dielectric multilayer film and a blue-reflection dielectric multilayer film that intersect crosswise. The dichroic prism 513 synthesizes respective modulated beams. The beams synthesized here pass through a projection lens 514 (a projection optical system) to form a picture image on a screen 515 that is not shown in the figure.

The projection-type image display unit 900 formed in the above-mentioned manner employs liquid crystal panels that modulate one kind of polarized light. Therefore, when conventional randomly polarized light is guided to this type of liquid crystal light valves, half of the light is absorbed by polarizing plates and is changed to heat. Consequently, the light utilization rate is low and at the same time a large cooling system having a high noise level is required for suppressing the heat generation in the polarizing plates, which have been problems. However, in the projection-type image display unit 900 of the present embodiment, such problems can be solved to a great extent, since the polarized-light illumination unit of the fourth embodiment that can supply light whose polarization directions have been aligned is used.

Further, according to the present embodiment, the minute lenses 205 in the second lens plate 204 substantially can be optimized corresponding to the illuminant images 112 on the second lens plate 204, thus minimizing their aperture areas and shapes. Consequently, an apparent area of the second lens plate that is seen through the polarization conversion section also can be made small. The f-number of the projection lens is determined based on the apparent size of the second lens plate and the distance from a liquid crystal panel to the second lens plate. Therefore, when the second lens plate can be reduced in apparent size, it is not necessary to decrease the f-number, i.e. to brighten the projection lens.

According to the present embodiment, even if the projection lens 514 is one used in a conventional unit in which polarization direction is not converted or one similar thereto, the increase in luminance of projection images can be attained adequately. Particularly, when the light valves are those using liquid crystal in which a wide incident angle causes the decrease in contrast, it is advantageous in improvement in image quality.

In the present embodiment as in the fifth embodiment, the light that had passed through the first, second, and third liquid crystal light valves 503, 505, and 511 was guided onto one optical axis by the dichroic prism 513 as a color synthesizer and thus was magnified and projected by one projection lens 514 of a projection optical system. However, the present invention is not particularly limited to this. For instance, without using the color synthesizer, projection lenses for respective color lights can be provided so as to magnify and project outgoing lights from the first, second, and third liquid crystal light valves 503, 505, and 511 for the respective color lights.

In the present embodiment, transmission-type liquid crystal was used as the light valves. However, the light valves are not limited to this. It is clear that completely the same effect can be obtained when using those to which polarization is applied.

When the polarized-light illumination unit 400 is used as an illumination unit to form a projection-type image display unit using light valves, besides three-plates type in which a color separation optical system is used and a light valve is provided for each color light as shown in FIG. 22, a single type (FIGS. 18 and 19) shown in the sixth embodiment using one light valve to obtain color display also can be employed.

Any of the embodiments described above is directed merely to make the technical contents of the present invention clear. The present invention should not be considered to be limited in such concrete examples. The present invention can be carried out by making changes variously which come within the range of the spirit and the claims of the present invention and is to be considered broadly.

INDUSTRIAL APPLICABILITY

The polarized-light illumination unit of the present invention can convert polarization directions of randomly polarized light emitted from a light source into a desired polarization direction and can suppress the spread of illumination light (can increase the illumination f-number) at the same time. Therefore, the polarized-light illumination unit can be used widely as an illumination unit that requires polarized light. Particularly, when the polarized-light illumination unit is used as an illumination unit for a projection-type image display unit with a light valve that modulates light using polarized light, the whole randomly polarized light from the light source can be utilized, thus improving the light utilization rate greatly. In addition, since the illumination f-number can be increased (the spread angle of incident light can be decreased), images with high luminance can be obtained without changing the f-number of a projection optical system in the projection-type image display unit. Furthermore, when microlenses are formed on the incident surface of the light valve, the workload of the projection optical system decreases, thus facilitating the achievement of the effect by the microlenses.

The projection-type image display unit of the present invention can improve the light utilization efficiency with a simple configuration and thus the brightness of projection images. Therefore, the projection-type image display unit can be used suitably, particularly as a liquid crystal projector that especially requires the increase in luminance and the reduction in cost.

What is claimed is:

1. A polarized-light illumination unit, comprising:

a light source for emitting randomly polarized light;

an integrator optical system having a first lens plate formed of an aggregate of a plurality of rectangular lenses, a second lens plate formed of an aggregate of a plurality of minute lenses corresponding to the rectangular lenses one to one, and a condenser lens;

a polarization separation section for separating light emitted from the light source into two polarized lights whose polarization directions are orthogonal to each other and whose optical axes are substantially parallel to each other; and a polarization conversion section for aligning the polarization directions of the two polarized lights, wherein the respective rectangular lenses are formed to have shifted centers of curvature with respect to centers of aperture so that illuminant images are formed in a plurality of rows on the second lens plate by the rectangular lenses in the first lens plate, the minute lenses in the second lens plate are arranged in a form of a plurality of rows at positions where the illuminant images are formed by the rectangular lenses, and the plurality of rows of the minute lenses includes at least one row that is different from the other rows in width H in a direction orthogonal to a longitudinal direction of the rows, the polarization separation section is formed by assembling a plurality of minute polarization beam splitters, each minute polarization beam splitter having a reflection-mirror plane provided obliquely to a system optical axis, a polarization separation plane provided in parallel to the reflection-mirror plane, and two planes orthogonal to the system optical axis, the polarization separation plane has a polarization separation film that separates light from the second lens plate by transmitting or reflecting the light depending on its polarization direction, and a distance d between the two planes orthogonal to the system optical axis is the same in all the minute polarization beam splitters forming the polarization separation section, and at least one minute polarization beam splitter that is different from the other splitters in distance h between the reflection-mirror plane and the polarization separation plane is included.

2. The polarized-light illumination unit according to claim 1, wherein an aperture of each minute lens in the second lens plate is formed corresponding to a size of each illuminant image.

3. The polarized-light illumination unit according to claim 1, wherein the distance d between the two planes is substantially the same as the width H of any of the rows of the minute lenses.

4. The polarized-light illumination unit according to claim 1, wherein the distance d between the two planes is substantially the same as the width H of a row that has the widest width H.

5. The polarized-light illumination unit according to claim 1, wherein an optical axis of the light source section and the first lens plate are placed at positions shifted in parallel with respect to the system optical axis for an amount about one and a half times of the distance d between the two planes.

6. A polarized-light illumination unit, comprising:

a light source for emitting randomly polarized light;

an integrator optical system having a first lens plate formed of an aggregate of a plurality of rectangular lenses, a second lens plate formed of an aggregate of a plurality of minute lenses corresponding to the rectangular lenses one to one, and a condenser lens;

a polarization separation section for separating light emitted from the light source into two polarized lights whose polarization directions are orthogonal to each other and whose optical axes are substantially parallel to each other; and a polarization conversion section for aligning the polarization directions of the two polarized lights, wherein the respective rectangular lenses are formed to have shifted centers of curvature with respect to centers of aperture so that illuminant images are formed in a plurality of rows on the second lens plate by the rectangular lenses in the first lens plate, the minute lenses in the second lens plate are arranged in a form of a plurality of rows at positions where the illuminant images are formed by the rectangular lenses, and the plurality of rows of the minute lenses includes at least one row that is different from the other rows in width H in a direction orthogonal to a longitudinal direction of the rows, the polarization separation section is formed by assembling a plurality of minute polarization beam splitters, each minute polarization beam splitter having a polarization separation plane provided obliquely to a system optical axis, a plane provided in parallel to the polarization separation plane, and two planes orthogonal to the system optical axis, the polarization separation plane has a polarization separation film that separates light from the second lens plate by transmitting or reflecting the light depending on its polarization direction, and a distance d between the two planes orthogonal to the system optical axis is the same in all the minute polarization beam splitters forming the polarization separation section, and at least one minute polarization beam splitter that is different from the other splitters in distance h between the polarization separation plane and a plane parallel thereto is included.

7. The polarized-light illumination unit according to claim 6, wherein an aperture of each minute lens in the second lens plate is formed corresponding to a size of each illuminant image.

8. The polarized-light illumination unit according to claim 6, wherein a total number of reflections of light that is counted from incidence of the light into the minute polarization beam splitters to emergence of the light therefrom is different among the plurality of minute polarization beam splitters when their distance h is different.

9. The polarized-light illumination unit according to claim 6, wherein when the distance h of a minute polarization beam splitter a with the shortest distance h is indicated with h MIN, the distance h of the other minute polarization beam splitters is nh MIN (wherein n represents a natural number).

10. The polarized-light illumination unit according to claim 6,
wherein minute polarization beam splitters in which the distance h is long are formed by joining a plurality of highly-refractive material layers forming minute polarization beam splitters in which the distance h is shorter.

11. The polarized-light illumination unit according to claim 6,
wherein the distance d between the two planes orthogonal to the system optical axis is set so as to include at least one minute polarization beam splitter in which a total number of reflections of light that is counted from incidence of the light thereinto to emergence of the light therefrom is at least four.

12. A polarized-light illumination unit, comprising:
a light source for emitting randomly polarized light;
an integrator optical system having a first lens plate formed of an aggregate of a plurality of rectangular lenses, a second lens plate formed of an aggregate of a plurality of minute lenses corresponding to the rectangular lenses one to one, and a condenser lens;
a polarization separation section for separating light emitted from the light source into two polarized lights whose polarization directions are orthogonal to each other and whose optical axes are substantially parallel to each other, and
a polarization conversion section for aligning the polarization directions of the two polarized lights,
wherein the respective rectangular lenses are formed to have shifted centers of curvature with respect to centers of aperture so that illuminant images are formed in a plurality of rows on the second lens plate by the rectangular lenses in the first lens plate,
the minute lenses in the second lens plate are arranged in a form of a plurality of rows at positions where the illuminant images are formed by the rectangular lenses, and the plurality of rows of the minute lenses includes at least one row that is different from the other rows in width H in a direction orthogonal to a longitudinal direction of the rows,
the polarization separation section is formed by assembling a plurality of minute polarization beam splitters having the same shape, each minute polarization beam splitter having a polarization separation plane provided obliquely to a system optical axis, a plane provided in parallel to the polarization separation plane, and two planes orthogonal to the system optical axis,
the polarization separation plane has a polarization separation film that separates light from the second lens plate by transmitting or reflecting the light depending on its polarization direction, and
a distance d between the two planes orthogonal to the system optical axis is set so as to include at least one minute polarization beam splitter in which a total number of reflections of light that is counted from incidence of the light thereinto to emergence of the light therefrom is at least four.

13. The polarized-light illumination unit according to claim 12,
wherein an aperture of each minute lens in the second lens plate is formed corresponding to a size of each illuminant image.

14. The polarized-light illumination unit according to claim 12,
wherein a distance between two long sides of a rectangular shape of an incident plane for a ray of light from the second lens plate in the minute polarization beam splitters is substantially the same as a width H of a row whose width H is the narrowest.

15. The polarized-light illumination unit according to claim 12,
wherein a distance between two long sides of a rectangular shape of an incident plane for a ray of light from the second lens plate in the minute polarization beam splitters is substantially $1/n_2$ of a width H of a row whose width H is the narrowest.

16. The polarized-light illumination unit according to claim 6 or 12,
wherein an optical axis of the light source section and the first lens plate are placed at positions shifted in parallel with respect to the system optical axis for an amount of about the half of the distanced between the two planes orthogonal to the system optical axis.

17. The polarized-light illumination unit according to claim 6 or 12,
wherein at least one minute polarization beam splitter in which a plane provided in parallel to the polarization separation plane is a reflection-mirror is included.

18. The polarized-light illumination unit according to claim 1, 6 or 12,
wherein the polarization conversion section comprises $\lambda/2$ plates.

19. The polarized-light illumination unit according to claim 1, 6 or 12,
wherein light emitted from the light source is projected onto an incident plane of each minute lens in the second lens plate as a secondary illuminant image via the first lens plate, and outgoing light from-the second lens plate passes through the polarization separation section and the polarization conversion section and illuminates an object to be illuminated by the condenser lens.

20. A projection-type image display unit comprising:
a polarized-light illumination unit;
a modulator having a light valve for displaying picture images corresponding to input signals by modulating polarized light from the polarized-light illumination unit; and
a projection optical system that magnifies and projects modulated beams on a screen, the beams having been modulated by the modulator,
wherein the polarized-light illumination unit is the polarized-light illumination unit according to claim 1.

21. A projection-type image display unit comprising:
a polarized-light illumination unit;
a modulator having a light valve for displaying picture images corresponding to input signals by modulating polarized light from the polarized-light illumination unit; and
a projection optical system that magnifies and projects modulated beams on a screen, the beams having been modulated by the modulator,
wherein the polarized-light illumination unit is the polarized-light illumination unit according to claim 6.

22. A projection-type image display unit comprising:
a polarized-light illumination unit;
a modulator having a light valve for displaying picture images corresponding to input signals by modulating polarized light from the polarized-light illumination unit; and a projection optical system that magnifies and projects modulated beams on a screen, the beams having been modulated by the modulator, wherein the polarized-light illumination unit is the polarized-light illumination unit according to claim 11.

23. The projection-type image display unit according to any of claims 20 to 22, wherein a color separation device is provided between the polarized-light illumination unit and the modulator, and modulators are provided for respective colors separated by the color separation device.

24. The projection-type image display unit according to claim 23, wherein a color synthesizer is provided between the modulator and the projection optical system.

* * * * *